United States Patent
Yokoyama et al.

(10) Patent No.: US 9,857,460 B2
(45) Date of Patent: Jan. 2, 2018

(54) WAVEFORM ESTIMATION DEVICE AND WAVEFORM ESTIMATION METHOD

(71) Applicant: Mitsubishi Electric Corporation, Tokyo (JP)

(72) Inventors: Yoshiaki Yokoyama, Tokyo (JP); Hiroshi Kameda, Tokyo (JP); Hiroshi Sakamaki, Tokyo (JP); Takafumi Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/526,113

(22) PCT Filed: Dec. 19, 2014

(86) PCT No.: PCT/JP2014/083724
§ 371 (c)(1),
(2) Date: May 11, 2017

(87) PCT Pub. No.: WO2016/098250
PCT Pub. Date: Jun. 23, 2016

(65) Prior Publication Data
US 2017/0307750 A1 Oct. 26, 2017

(51) Int. Cl.
*G01S 13/70* (2006.01)
*G01S 13/66* (2006.01)
*G01S 13/95* (2006.01)

(52) U.S. Cl.
CPC .............. *G01S 13/66* (2013.01); *G01S 13/95* (2013.01)

(58) Field of Classification Search
CPC .................................. G01S 13/66; G01S 13/95
(Continued)

(56) References Cited

U.S. PATENT DOCUMENTS 6,922,145 B2 * 7/2005 Piesinger ................ G01S 7/415
340/506
8,427,359 B1  4/2013 Bickel et al.
(Continued)

FOREIGN PATENT DOCUMENTS

JP  H08-292273 A  11/1996
JP  H09-297176 A  11/1997
(Continued)

OTHER PUBLICATIONS

International Search Report issued in PCT/JP2014/083724; dated Mar. 17, 2015.

*Primary Examiner* — Marcus E Windrich
(74) *Attorney, Agent, or Firm* — Studebaker & Brackett PC

(57) ABSTRACT

A waveform estimation device includes: tracking filter processing units 11 and 12 that execute tracking filter processing on observation values using tracking filters having different drive noises; and a filter output selection unit 14 that selects a regular waveform component predicted by the tracking filter processing unit 11, in an irregular section, and selects a regular waveform component predicted by the tracking filter processing unit 12, in a regular section. A residual processing unit 16 calculates a residual between observation values extracted by an observation value extraction unit 1, and a regular waveform component selected by the filter output selection unit 14. An irregular waveform detection unit 17 determines whether the residual is an irregular waveform component.

9 Claims, 18 Drawing Sheets

(58) Field of Classification Search
USPC .................................................. 342/95, 139
See application file for complete search history.

(56) References Cited

U.S. PATENT DOCUMENTS

| | | | | |
|---|---|---|---|---|
| 2007/0144242 | A1* | 6/2007 | Matsumiya | G01V 1/008 |
| | | | | 73/82 |
| 2008/0021657 | A1* | 1/2008 | Barkal | G01V 1/008 |
| | | | | 702/14 |
| 2013/0333483 | A1* | 12/2013 | Horoshenkov | G01F 23/2962 |
| | | | | 73/861.25 |

FOREIGN PATENT DOCUMENTS

| | | |
|---|---|---|
| JP | H10-122860 A | 5/1998 |
| JP | H11-160454 A | 6/1999 |
| JP | 2012-167950 A | 9/2012 |
| JP | 2013-167476 A | 8/2013 |
| JP | 2014-089057 A | 5/2014 |
| JP | 2014-098686 A | 5/2014 |

* cited by examiner

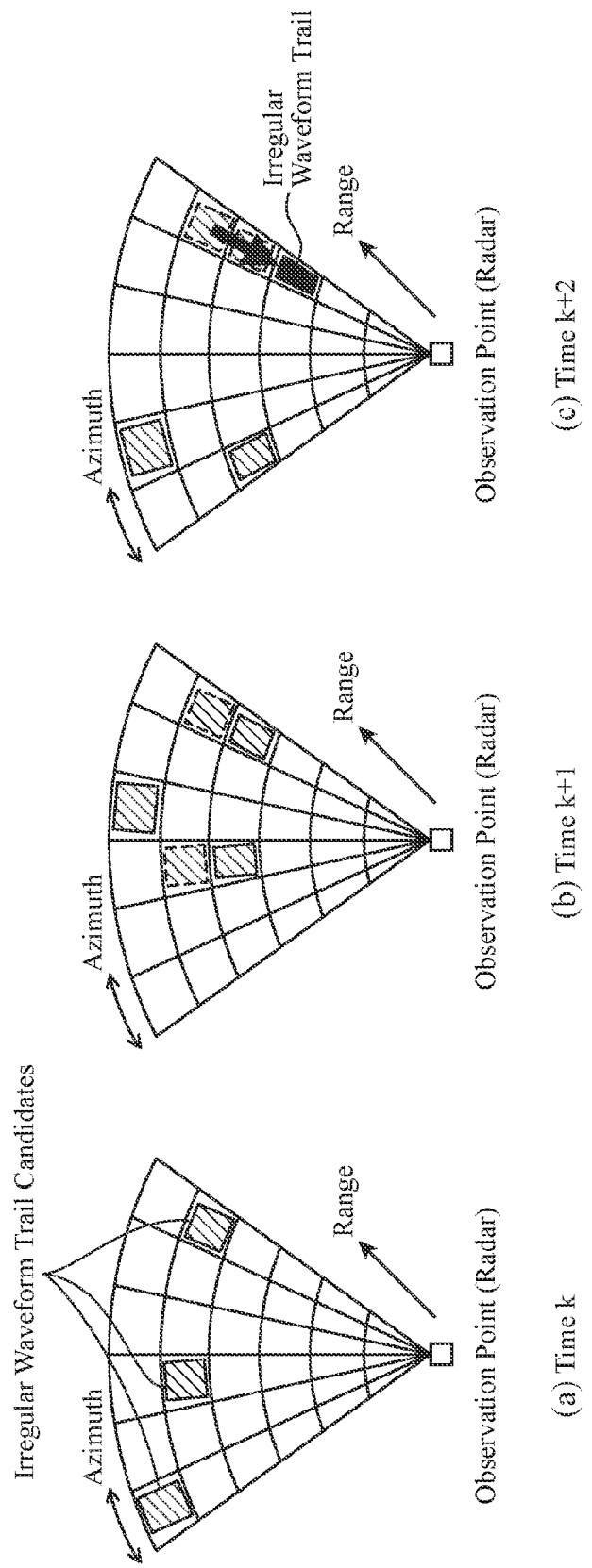

WAVEFORM ESTIMATION DEVICE AND WAVEFORM ESTIMATION METHOD

TECHNICAL FIELD

The present invention relates to a waveform estimation device and a waveform estimation method that identify regular waveform components and irregular waveform components included in a signal.

BACKGROUND ART

There is a waveform estimation device that receives an input of an actual measurement data including regular waveform components and irregular waveform components, estimates the regular waveform components serving as a trend of the actual measurement data, and calculates a difference between the actual measurement data and the regular waveform components, thereby estimating the irregular waveform components.

Such a waveform estimation device can identify the regular waveform components and the irregular waveform components included in the actual measurement data.

For example, in a case where the actual measurement data is a signal including regular long-period waveform components caused by tide (hereinafter, referred to as "tidal components"), and irregular short-period waveform components caused by tsunami (hereinafter, referred to as "tsunami components"), by predicting the regular tidal components serving as a trend of the actual measurement data, and obtaining a difference between the predicted value and the actual measurement data, the irregular tsunami components can be extracted.

In the detection processing of tsunami, if the extracted tsunami components are larger than a preset threshold value, it is determined that the actual measurement data shows the existence of tsunami.

Here, regular tidal components can be predicted from an astronomical tide level, and the astronomical tide level is a predicted value of a tide level that is calculated by analyzing tide level data observed in the past.

However, while the astronomical tide level can be calculated in a tide gauge station provided in a predetermined standard port, it cannot be calculated at a point where a tide gauge station is not provided.

Thus, in the waveform estimation device disclosed in the following Patent Literature 1, by identifying components having a period equal to or larger than a threshold value as a change in water level that is caused by tide, tidal components related to a change in water level that is caused by tide are extracted from actual measurement data.

The extraction of tidal components is realized by performing Fourier transformation-based filtering processing using a certain period serving as a threshold value as a numerical filter.

Tsunami can be thereby detected even at a point where a tide gauge station is not provided.

CITATION LIST

Patent Literature

Patent Literature 1: JP 2012-167950 A (paragraphs [0033] to [0034])

SUMMARY OF INVENTION

Technical Problem

Because a conventional waveform estimation device has the above-described configuration, a period and amplitude of actual measurement data vary in accordance with the influence of cold current, warm current, drift current, coastal current, and the like, aside from tide. Thus, even if a predicted values of tidal components are calculated by performing the Fourier transformation-based filtering processing, the prediction of values of tidal components delays from an actual measurement data. Thus, there is a problem that tidal components cannot be correctly predicted, and tsunami components cannot be detected correctly.

The present invention is devised for solving the above-described problem, and the object of the present invention is to obtain a waveform estimation device and waveform estimation method that can correctly detect irregular waveform components included in a signal.

Solution to Problem

According to the present invention, a waveform estimation device includes: an observation value extraction unit extracting, from a signal radiated or reflected by an observation target, time-series observation values of the observation target; a first tracking filter unit predicting a regular waveform component included in the observation values, by executing tracking filter processing on the time-series observation values; a second tracking filter unit predicting a regular waveform component included in the observation values, by executing tracking filter processing on the time-series observation values using a tracking filter having larger drive noise than drive noise of a tracking filter used in the tracking filter processing by the first tracking filter unit; an irregular section identification unit identifying, an irregular section being a section including an irregular waveform component among the time-series observation values; a selection unit selecting a regular waveform component predicted by the first tracking filter unit, in the irregular section, and selecting a regular waveform component predicted by the second tracking filter unit, in a section other than the irregular section, among regular waveform components predicted by the first and second tracking filter units; and an irregular waveform determination unit determining whether a residual between observation values extracted by the observation value extraction unit, and a regular waveform component selected by the selection unit is an irregular waveform component.

Advantageous Effects of Invention

According to the present invention, the first and second tracking filter units execute tracking filter processing on observation values extracted by the observation value extraction unit using tracking filters having different drive noises. The selection unit selects a regular waveform component predicted by the first tracking filter unit in the irregular section identified by the irregular section identification unit, and selects a regular waveform component predicted by the second tracking filter unit in a section other than the irregular section, among regular waveform components predicted by the first and second tracking filter units, respectively. The irregular waveform determination unit determines whether a residual between observation values extracted by the observation value extraction unit and a regular waveform component selected by the selection unit is an irregular waveform component. According to the above configuration, an irregular waveform component included in a signal can be correctly detected.

BRIEF DESCRIPTION OF DRAWINGS

FIG. 24 is an explanatory diagram illustrating an example of an extracted trail of an irregular waveform component.

DESCRIPTION OF EMBODIMENTS

For describing the present invention in more detail, some embodiments for carrying out the present invention will be described below in accordance with the accompanying drawings.

First Embodiment

Figure 1:
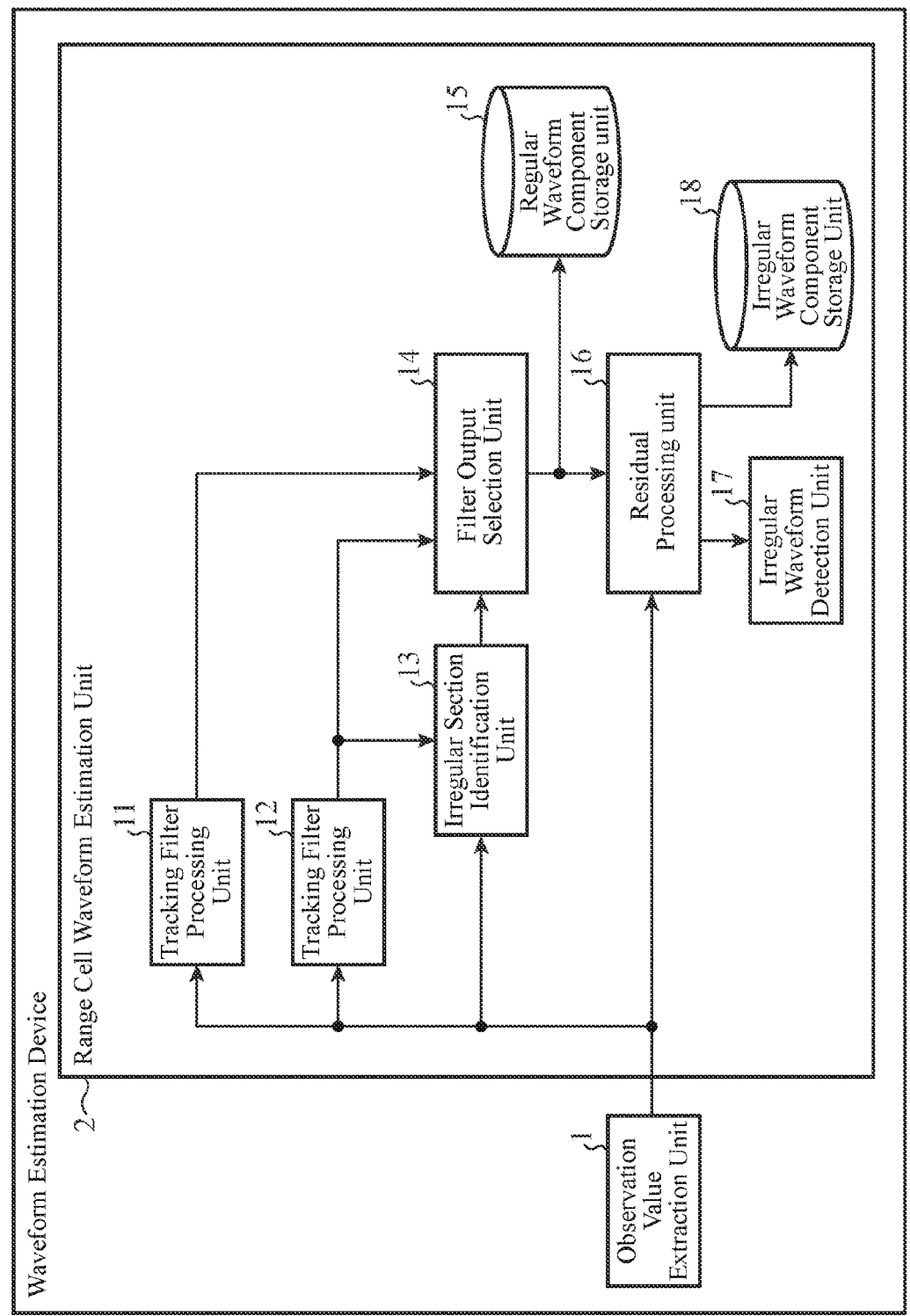
FIG. 1 is a configuration diagram illustrating a waveform estimation device according to a first embodiment of the present invention.

FIG. 1 is a configuration diagram illustrating a waveform estimation device according to a first embodiment of the present invention.

In FIG. 1, an observation value extraction unit 1 executes processing of detecting, using a radar, an optical sensor, an infrared sensor, for example, for each range cell in a two-dimensional space of a range direction and an azimuth direction, a signal radiated or reflected from an observation target in a corresponding range cell. The observation value extraction unit 1 executes predetermined signal processing on the detected signal, thereby extracting time-series observation values of the observation target.

The time-series observation values (time-series data) extracted by the observation value extraction unit 1 are broadly divided into an regular section only including regular waveform components, and an irregular section including both regular waveform components and irregular waveform components.

A range cell waveform estimation unit 2 executes processing of identifying, for each range cell in the two-dimensional space, regular waveform components and irregular waveform components that are included in the observation values extracted by the observation value extraction unit 1.

A tracking filter processing unit 11 in which a tracking filter (e.g., a linear least squares filter, an α-β filter, a Kalman filter, etc.) is implemented executes tracking filter processing on observation values extracted by the observation value extraction unit 1 using the tracking filter, predicts a regular waveform component included in the observation values, and outputs a predicted value indicating a regular waveform component to a filter output selection unit 14. Here, the tracking filter processing unit 11 forms a first tracking filter unit.

In a tracking filter processing unit 12, a tracking filter having larger drive noise than that of the tracking filter (e.g., a linear least squares filter, an α-β filter, a Kalman filter, etc.) implemented by the tracking filter processing unit 11 is implemented. The tracking filter processing unit 12 executes tracking filter processing on observation values extracted by the observation value extraction unit 1 using the tracking filter, predicts a regular waveform component included in the observation values, and outputs a predicted value indicating a regular waveform component to the filter output selection unit 14. Here, the tracking filter processing unit 12 forms a second tracking filter unit.

An irregular section identification unit 13 executes processing of identifying an irregular section being a section including irregular waveform components, among time-series observation values extracted by the observation value extraction unit 1.

The filter output selection unit 14 executes processing of selecting a regular waveform component predicted by the tracking filter processing unit 11 in the irregular section identified by the irregular section identification unit 13, and selecting a regular waveform component predicted by the tracking filter processing unit 12 in the regular section identified by the irregular section identification unit 13, among regular waveform components predicted by the tracking filter processing units 11 and 12.

A regular waveform component storage unit 15 is formed by a storage device such as, for example, a random access memory (RAM) or a hard disk, and stores a regular waveform component selected by the filter output selection unit 14.

A residual processing unit 16 executes processing of calculating a residual between observation values extracted by the observation value extraction unit 1, and a regular waveform component selected by the filter output selection unit 14.

An irregular waveform detection unit 17 executes processing of determining whether the residual calculated by the residual processing unit 16 is an irregular waveform component.

More specifically, the irregular waveform detection unit 17 executes processing of comparing a residual calculated by the residual processing unit 16 and a preset threshold value, and if the residual is equal to or larger than the threshold value, determining that the residual is an irregular waveform component.

Here, the residual processing unit 16 and the irregular waveform detection unit 17 form an irregular waveform determination unit.

An irregular waveform component storage unit 18 is formed by a storage device such as, for example, a RAM or a hard disk, and stores a residual calculated by the residual processing unit 16.

In the example in FIG. 1, the observation value extraction unit 1, the tracking filter processing units 11 and 12, the irregular section identification unit 13, the filter output selection unit 14, the regular waveform component storage unit 15, the residual processing unit 16, the irregular waveform detection unit 17, and the irregular waveform component storage unit 18, which are constituent elements of the waveform estimation device, are each assumed to be formed by dedicated hardware (e.g., hardware such as a semiconductor integrated circuit implementing a central processing unit (CPU), or a one-chip microcomputer, for constituent elements other than the regular waveform component storage unit 15 and the irregular waveform component storage unit 18). However, the waveform estimation device may be formed by a computer.

Figure 2:
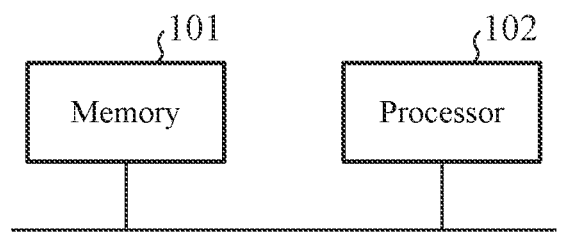
FIG. 2 is a hardware configuration diagram in a case in which the waveform estimation device is formed by a computer.

FIG. 2 is a hardware configuration diagram in a case in which the waveform estimation device is formed by a computer.

The waveform estimation device can be formed by a computer in the following manner. The regular waveform component storage unit 15 and the irregular waveform component storage unit 18 are formed on a memory 101 of the computer or on an external memory, and programs in which the processing details of the observation value extraction unit 1, the tracking filter processing units 11 and 12, the irregular section identification unit 13, the filter output selection unit 14, the residual processing unit 16, and the irregular waveform detection unit 17 are described are stored in the memory 101 of the computer, and a processor 102 of the computer executes the programs stored in the memory 101.

Figure 3:
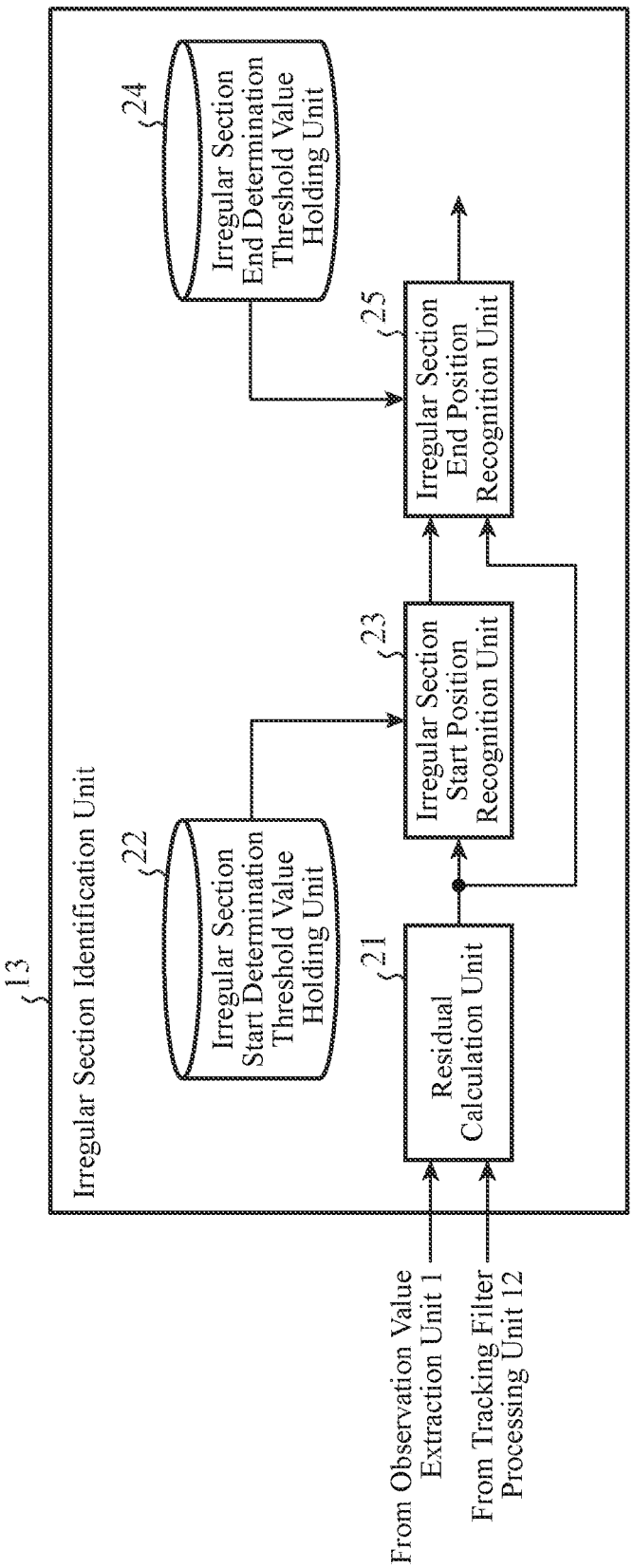
FIG. 3 is a configuration diagram illustrating an irregular section identification unit 13 of the waveform estimation device according to the first embodiment of the present invention.

FIG. 3 is a configuration diagram illustrating the irregular section identification unit 13 of the waveform estimation device according to the first embodiment of the present invention.

In FIG. 3, a residual calculation unit 21 executes processing of calculating a residual e between time-series observation values extracted by the observation value extraction unit 1 and a regular waveform component predicted by the tracking filter processing unit 12.

An irregular section start determination threshold value holding unit 22 is a memory holding preset irregular section start determination threshold values $\alpha$ and $\beta$, and holding number of times threshold values P and Q as threshold values indicating preset numbers of times, respectively.

An irregular section start position recognition unit 23 executes processing of identifying a section in which a magnitude $|e|$ of a residual e calculated by the residual calculation unit 21 exceeds the irregular section start determination threshold value $\alpha$ held by the irregular section start determination threshold value holding unit 22, P consecutive times (the number of times indicated by the number of times threshold value P), or a section in which the magnitude $|e|$ of the residual e exceeds the irregular section start determination threshold value $\beta$, Q consecutive times (the number of times indicated by the number of times threshold value Q), and recognizing these sections as sections serving as a start position of the irregular section.

An irregular section end determination threshold value holding unit 24 is a memory holding a preset irregular section end determination threshold value $\gamma$, and holding the number of times threshold value S as a threshold value indicating a preset number of times.

An irregular section end position recognition unit 25 executes processing of identifying, after the start position of the irregular section is recognized by the irregular section start position recognition unit 23, a section in which the magnitude $|e|$ of a residual e calculated by the residual calculation unit 21 falls below the irregular section end determination threshold value $\gamma$ held by the irregular section end determination threshold value holding unit 24, S consecutive times (the number of times indicated by the number of times threshold value S), and recognizing the section as a section serving as an end position of the irregular section.

Figure 4:
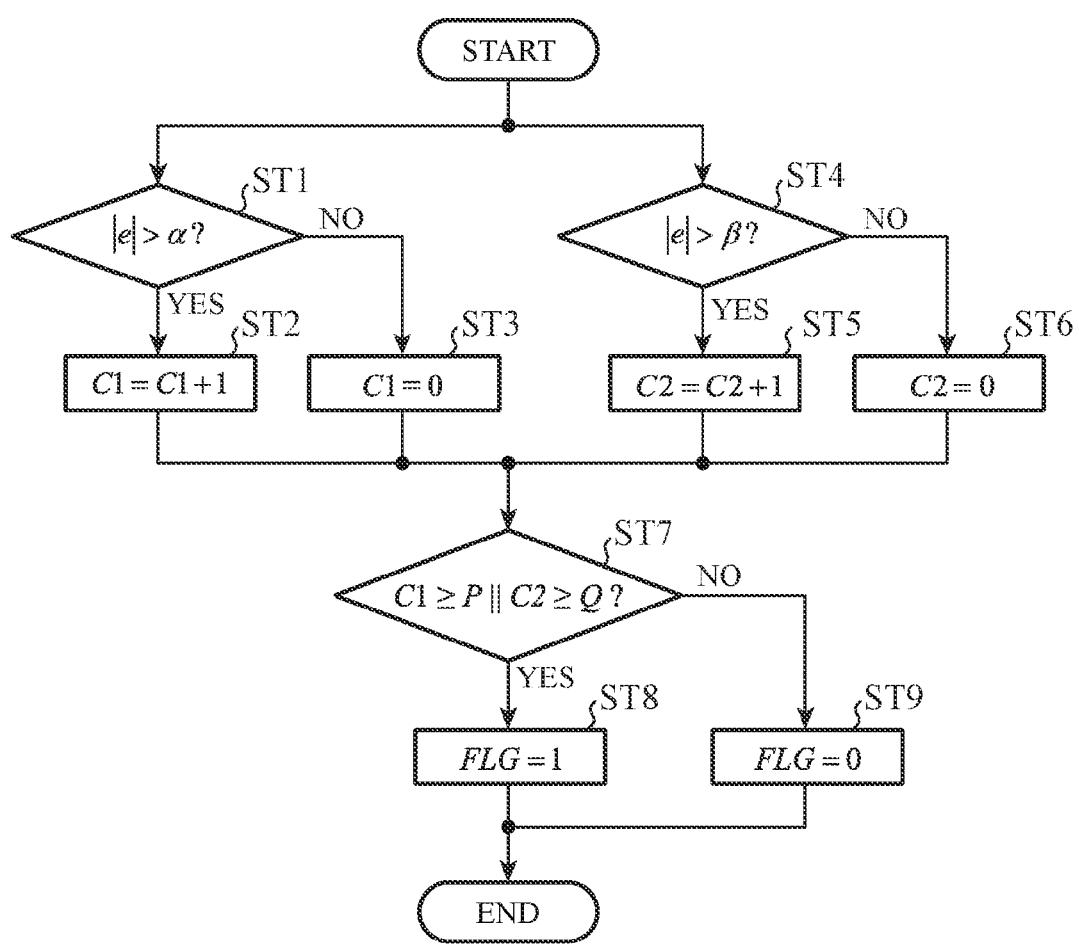
FIG. 4 is a flowchart illustrating processing of an irregular section start position recognition unit 23 of the waveform estimation device according to the first embodiment of the present invention.

FIG. 4 is a flowchart illustrating processing details of the irregular section start position recognition unit 23 of the waveform estimation device according to the first embodiment of the present invention.

Figure 5:
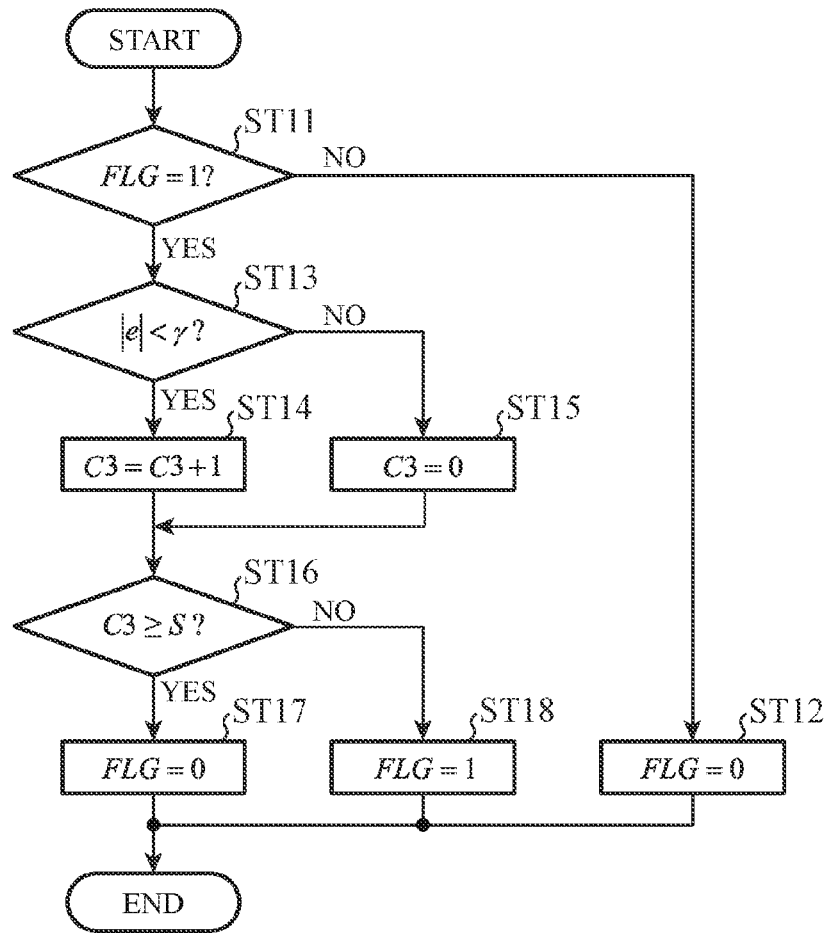
FIG. 5 is a flowchart illustrating processing of an irregular section end position recognition unit 25 of the waveform estimation device according to the first embodiment of the present invention.

FIG. 5 is a flowchart illustrating processing details of the irregular section end position recognition unit 25 of the waveform estimation device according to the first embodiment of the present invention.

Figure 6:
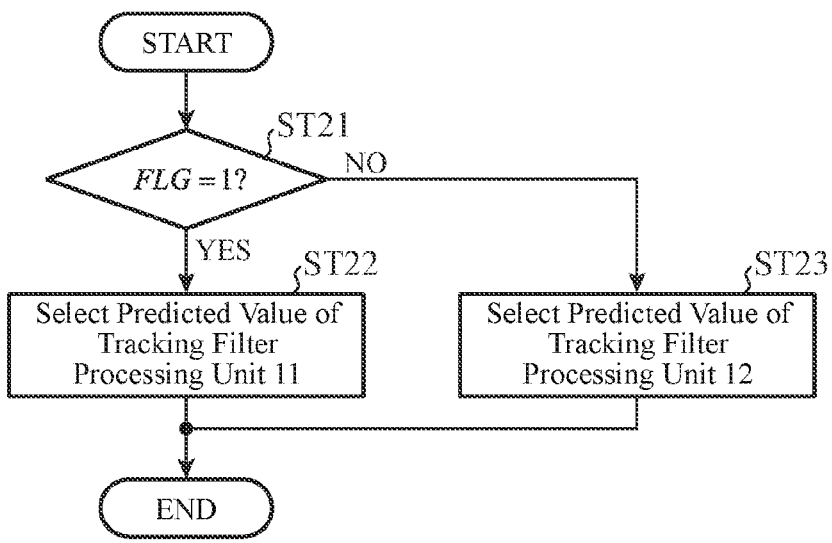
FIG. 6 is a flowchart illustrating processing of a filter output selection unit 14 of the waveform estimation device according to the first embodiment of the present invention.

In addition, FIG. 6 is a flowchart illustrating processing details of the filter output selection unit 14 of the waveform estimation device according to the first embodiment of the present invention.

Next, an operation in this embodiment will be described.

The observation value extraction unit 1 detects, using a radar, an optical sensor, an infrared sensor, for example, for each range cell in the two-dimensional space of the range direction and the azimuth direction, a signal radiated or reflected from an observation target in a corresponding range cell, and executes predetermined signal processing on the signal, thereby extracting time-series observation values of the observation target.

Figure 7:
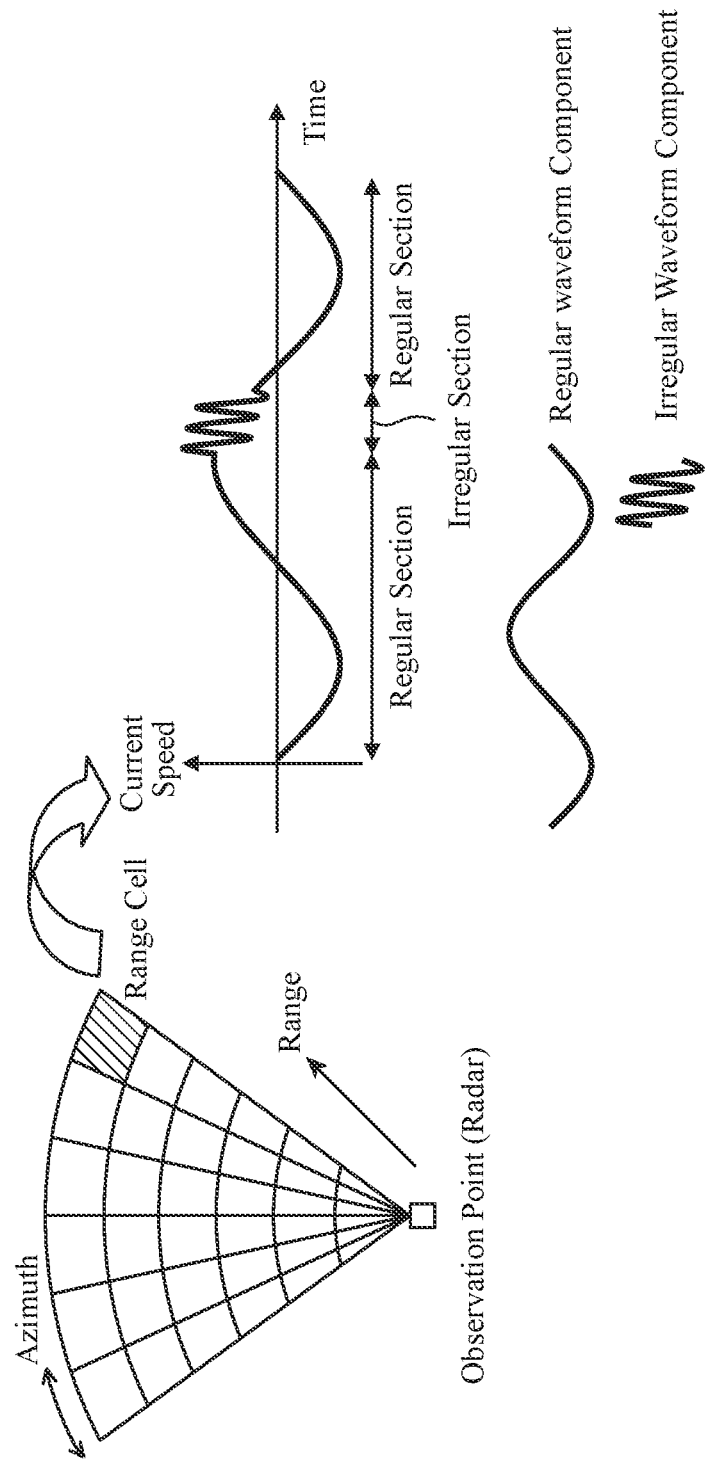
FIG. 7 is an explanatory diagram illustrating time-series observation values extracted by an observation value extraction unit 1, for each range cell of a two-dimensional space.

For example, in the case of using a radar for measuring a flow velocity in an eye gaze detection, as illustrated in FIG. 7, for each range cell in the two-dimensional space of the range direction and the azimuth direction, observation values indicating a flow velocity of a corresponding range cell is extracted by the observation value extraction unit 1 from a radar signal.

As illustrated in FIG. 7, the observation values (time-series data of the flow velocity) extracted by the observation value extraction unit 1 are broadly divided into a regular section only including regular waveform components, and an irregular section including both regular waveform components and irregular waveform components.

The range cell waveform estimation unit 2 executes processing of identifying, for each range cell in the two-dimensional space, regular waveform components and irregular waveform components that are included in observation values extracted by the observation value extraction unit 1.

The processing details of the range cell waveform estimation unit 2 will be specifically described below.

The tracking filter processing unit 11, in which a tracking filter (e.g., a linear least squares filter, an α-β filter, a Kalman filter, etc.) is implemented, executes tracking filter processing on observation values extracted by the observation value extraction unit 1 using the tracking filter, predicts a regular waveform component included in the observation values, and outputs a predicted value indicating a regular waveform component to the filter output selection unit 14.

For example, in the case of using the Kalman filter as the tracking filter, a motion model represented by the following formula (1) and an observation model represented by Formula (2) are defined.

$$x_{k+1} = \Phi_k x_k + w_k \quad (1)$$

$$z_k = H_k x_k + v_k \quad (2)$$

In Formula (1), $x_k$ denotes a state vector (e.g., flow velocity, flow velocity change rate, etc.) at a time k, $\Phi_k$ denotes a transition matrix at the time k, and $w_k$ denotes drive noise representing a fluctuation of a target motion (motion of the observation target) at the time k.

In addition, in Formula (2), $z_k$ denotes an observation vector (observation values) at the time k, $H_k$ denotes an observation matrix at the time k, and $v_k$ denotes an observation noise vector representing an error of observation values with respect to a true value at the time k.

Regarding the transition matrix $\Phi_k$ in Formula (1), for example, a uniform linear motion, a uniform acceleration linear motion, a sine-wave motion represented by the following formula (3), and the like are defined, in accordance with a target motion state.

$$\Phi_k = \begin{bmatrix} \cos(\omega T_k) & \dfrac{\cos(\omega T_k)}{\omega} \\ -\omega \sin(\omega T_k) & \cos(\omega T_k) \end{bmatrix} \quad (3)$$

In Formula (3), ω denotes an angular frequency, and $T_k$ denotes a sampling interval at the time k.

For example, in the case of using the Kalman filter, the tracking filter processing unit 11 calculates a predicted vector (predicted value) from a time k−1 to the time k, by executing prediction processing represented by the following formula (4).

In addition, in the case of using the Kalman filter, the tracking filter processing unit 11 calculates a smoothed value (estimated value) being a smoothed vector at the time k, by executing smoothing processing represented by the following formula (5).

$$\tilde{x}_{k|k-1} = \Phi_{k-1} \hat{x}_{k-1|k-1} \quad (4)$$

$$\hat{x}_{k|k} = \tilde{x}_{k|k-1} + K_k(z_k - H_k \tilde{x}_{k|k-1}) \quad (5)$$

In Formula (4), $x_{k|k-1}$ tilde (in the text of the specification, the representation such as "x tilde" is used, because the sign "~" cannot be added as a superior of a character "x" under a limitation of the electronic patent application) denotes a predicted vector (predicted value) from the time k−1 to the time k.

$x_{k-1|k-1}$ hat (in the text of the specification, the representation such as "x hat" is used, because the sign "^" cannot be added as a superior of a character "x" under a limitation of the electronic patent application) denotes a smoothed vector (estimated value) at the time k−1.

In Formula (5), $x_{k|k}$ hat denotes a smoothed vector (estimated value) at the time k, and $K_k$ denotes a Kalman gain at the time k.

For estimating a regular waveform component serving as a trend, in the irregular section, the tracking filter processing unit 11 uses a Kalman filter having small drive noise $w_k$.

When the drive noise $w_k$ is made smaller, the Kalman gain $K_k$ in Formula (5) become smaller. Thus, an estimated value largely weighted on a predicted value is obtained.

Thus, even if irregular waveform components are included, a regular waveform component serving as a trend can be predicted.

Similarly to the tracking filter processing unit 11, the tracking filter processing unit 12, in which a tracking filter (e.g., a linear least squares filter, an α-β filter, a Kalman filter, etc.) is implemented, executes tracking filter processing on observation values extracted by the observation value extraction unit 1 using the tracking filter, predicts a regular waveform component included in the observation values, and outputs a predicted value indicating a regular waveform component to the filter output selection unit 14.

However, in the tracking filter processing unit 12, a tracking filter having larger drive noise than that of the tracking filter implemented by the tracking filter processing unit 11 is implemented for enabling prediction performed to follow observation values in the regular section.

For example, in the case of using the Kalman filter as a tracking filter, when the drive noise $w_k$ is made larger, the Kalman gain $K_k$ in Formula (5) becomes larger. Thus, an estimated value largely weighted on observation values is obtained.

Figure 8:
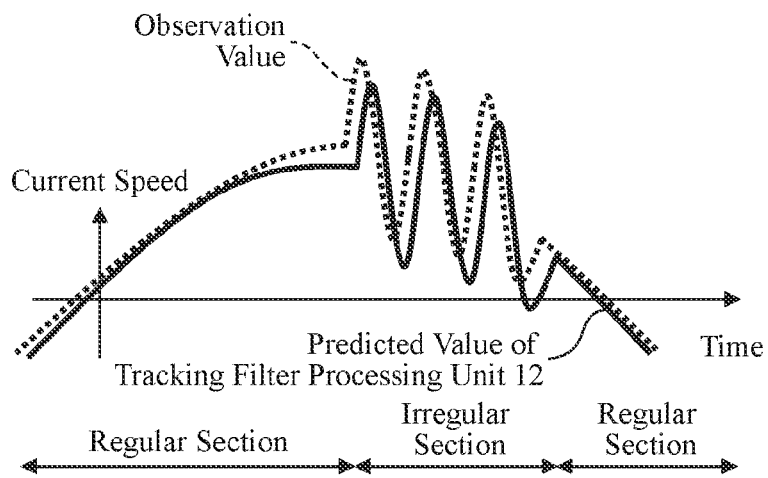
FIG. 8 is an explanatory diagram illustrating tracking filter processing performed on observation values by a tracking filter processing unit 12.

Consequently, in the tracking filter processing unit 12, prediction following observation values can be performed as illustrated in FIG. 8.

In the above example, the Kalman filter used for each of the tracking filter processing units 11 and 12 is assumed to be a linear Kalman filter. Alternatively, an extended Kalman filter, an unscented Kalman filter, a particle filter, and the like may be used as applications to a nonlinear system.

In addition, in the above example, the tracking filter processing unit 11 and the tracking filter processing unit 12 use the Kalman filters having different drive noises $w_k$. Alternatively, in place of the drive noises $w_k$, tracking filters in which observation noises having different magnitudes are set may be used.

The irregular section identification unit 13 executes processing of identifying an irregular section being a section including irregular waveform components, among time-series observation values extracted by the observation value extraction unit 1.

The processing details of the irregular section identification unit 13 will be specifically described below.

When the tracking filter processing unit 12 predicts a regular waveform component, the residual calculation unit 21 calculates, as illustrated in the following formula (6), a residual $e_k$ between observation values $z_k$ at the time k that is extracted by the observation value extraction unit 1, and a predicted value $x_{k|k-1}$ tilde from the time k−1 to the time k that is output by the tracking filter processing unit 12.

$$e_k = z_k - H_k \tilde{x}_{k|k-1} \quad (6)$$

Figure 9:
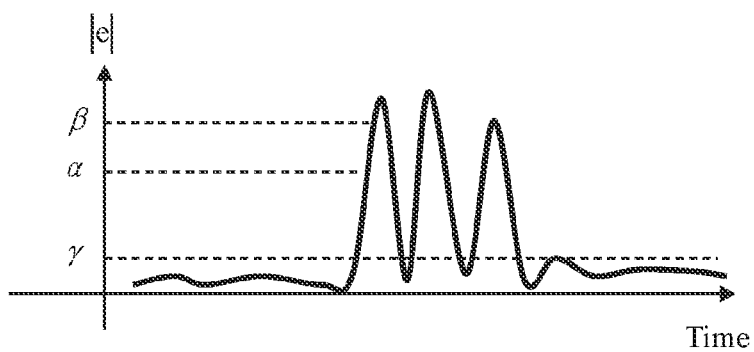
FIG. 9 is an explanatory diagram illustrating a magnitude of a residual $e_k$ calculated by a residual calculation unit 21 as time-series data.

The magnitude of the residual $e_k$ calculated by the residual calculation unit 21 is represented as time-series data as shown in FIG. 9.

The irregular section start position recognition unit 23 reads out the irregular section start determination threshold values α and β, and the number of times threshold values P and Q that are held by the irregular section start determination threshold value holding unit 22. Here, for the sake of explanatory convenience, α<β and P>Q are assumed to be satisfied.

When the residual calculation unit 21 calculates the residual $e_k$, the irregular section start position recognition unit 23 identifies a section in which the magnitude |e| of the residual e exceeds the irregular section start determination threshold value α, P consecutive times, or a section in which the magnitude |e| of the residual e exceeds the irregular section start determination threshold value β, Q consecutive times.

The irregular section start position recognition unit 23 recognizes the section in which the magnitude |e| of the residual e consecutively exceeds the irregular section start determination threshold value α (or β) as a start position of the irregular section.

The processing details of the irregular section start position recognition unit 23 will be specifically described below.

Each time the residual calculation unit 21 calculates a residual $e_k$, the irregular section start position recognition unit 23 compares the magnitude |e| of the residual e and the irregular section start determination threshold value α (step ST1 in FIG. 4), and if the magnitude |e| of the residual e is larger than the irregular section start determination threshold value α (|e|>α: Yes in step ST1), increments a count value of a counter C1 by 1 (step ST2). Here, the default value of the count value of the counter C1 is 0.

On the other hand, if the magnitude |e| of the residual e is equal to or smaller than the irregular section start determination threshold value α (|e|≤α: No in step ST1), the count value of the counter C1 is reset to 0 (step ST3).

In addition, concurrently with the processing in steps ST1 to ST3, the irregular section start position recognition unit 23 compares the magnitude |e| of the residual e calculated by the residual calculation unit 21, and the irregular section start determination threshold value β (step ST4), and if the magnitude |e| of the residual e is larger than the irregular section start determination threshold value β (|e|>β: Yes in step ST4), increments a count value of a counter C2 by 1 (step ST5). Here, the default value of the count value of the counter C2 is 0.

On the other hand, if the magnitude |e| of the residual e is equal to or smaller than the irregular section start determination threshold value β (|e|≤β: No in step ST4), the count value of the counter C2 is reset to 0 (step ST6).

Next, the irregular section start position recognition unit 23 compares the current count value of the counter C1 and the number of times threshold value P, and compares the current count value of the counter C2 and the number of times threshold value Q (step ST7).

If the current count value of the counter C1 is equal to or larger than the number of times threshold value P, or if the current count value of the counter C2 is equal to or larger than the number of times threshold value Q (Yes in step ST7), the irregular section start position recognition unit 23 recognizes the start of the irregular section, sets a determination value FLG to 1, and outputs the determination value FLG to the irregular section end position recognition unit 25 (step ST8).

On the other hand, if the current count value of the counter C1 is smaller than the number of times threshold value P, and the current count value of the counter C2 is smaller than the number of times threshold value Q (No in step ST7), the irregular section start position recognition unit 23 does not recognize the start of the irregular section and sets the determination value FLG to 0, and outputs the determination value FLG to the irregular section end position recognition unit 25 (step ST9).

The above description shows the case that the irregular section start position recognition unit 23 identifies a section in which the magnitude |e| of the residual e exceeds the irregular section start determination threshold value α, P consecutive times, or a section in which the magnitude |e| of the residual e exceeds the irregular section start determination threshold value β, Q consecutive times, and recognizes the section in which the above exceeding is detected as a start position of the irregular section. Alternatively, for example, the irregular section start position recognition unit 23 may be designed to recognize the start of the irregular section, when the number of times the magnitude |e| of the residual e exceeds the irregular section start determination threshold value α is M times out of N times.

When the irregular section start position recognition unit 23 recognizes the start of the irregular section and sets the determination value FLG to 1, the irregular section end position recognition unit 25 reads out the irregular section end determination threshold value γ and the number of times threshold value S that are held by the irregular section end position recognition unit 25.

The irregular section end position recognition unit 25 identifies a section in which the magnitude |e| of the residual e calculated by the residual calculation unit 21 falls below the irregular section end determination threshold value γ, S consecutive times.

The irregular section end position recognition unit 25 recognizes the section in which the magnitude |e| of the residual e falls below the irregular section end determination threshold value γ, S consecutive times, as a section serving as an end position of the irregular section.

The processing details of the irregular section end position recognition unit 25 will be specifically described below.

The irregular section end position recognition unit 25 determines whether the determination value FLG output from the irregular section start position recognition unit 23 is 1 (step ST11 in FIG. 5).

If the determination value FLG is 0 (No in step ST11), because the state of the irregular section has not been started yet, the irregular section end position recognition unit 25 outputs the determination value FLG (=0) to the filter output selection unit 14, without executing the processing of recognizing the end position of the irregular section (step ST12).

If the determination value FLG is 1 (Yes in step ST11), because the state of the irregular section has started, the irregular section end position recognition unit 25 compares, each time the residual calculation unit 21 calculates a residual $e_k$, the magnitude $|e|$ of the residual e and the irregular section end determination threshold value $\gamma$ (step ST13). If the magnitude $|e|$ of the residual e is smaller than the irregular section end determination threshold value $\gamma$ ($|e|<\gamma$: Yes in step ST13), the irregular section end position recognition unit 25 increments a count value of a counter C3 by 1 (step ST14). Here, the default value of the count value of the counter C3 is 0.

On the other hand, if the magnitude $|e|$ of the residual e is equal to or larger than the irregular section end determination threshold value $\gamma$ ($|e|\geq\gamma$: No in step ST13), the count value of the counter C3 is reset to 0 (step ST15).

Next, the irregular section end position recognition unit 25 compares a current count value of the counter C3 and the number of times threshold value S (step ST16).

If the current count value of the counter C3 is equal to or larger than the number of times threshold value S (Yes in step ST16), the irregular section end position recognition unit 25 recognizes an end of the irregular section, sets a determination value FLG to 0, and outputs the determination value FLG to the filter output selection unit 14 (step ST17).

On the other hand, if the current count value of the counter C3 is smaller than the number of times threshold value S (No in step ST16), the irregular section end position recognition unit 25 does not recognize the end of the irregular section, sets the determination value FLG to 1, and outputs the determination value FLG to the filter output selection unit 14 (step ST18).

The above description shows the case that the irregular section end position recognition unit 25 identifies a section in which the magnitude $|e|$ of the residual e falls below the irregular section end determination threshold value $\gamma$, S consecutive times, and recognizes the section in which the magnitude $|e|$ falls below the irregular section end determination threshold value $\gamma$ as a section serving as an end position of the irregular section. Alternatively, for example, the irregular section end position recognition unit 25 may be designed to recognize the end of the irregular section, when the number of times the magnitude $|e|$ of the residual e falls below the irregular section end determination threshold value $\gamma$ is M times out of N times. In addition, instead of the magnitude $|e|$ of the residual e, a residual quadratic form represented by Formula (7) may be used for determination.

$$(z_k - H_k \tilde{x}_{k|k-1})^T S_k^{-1} (z_k - H_k \tilde{x}_{k|k-1}) \quad (7)$$

$$S_k = H_k P_{k|k-1} H_k^T + R_k \quad (8)$$

In Formulae (7) and (8), $S_k$ denotes a residual covariance matrix at the time k, and $P_{k|k-1}$ denotes a prediction error covariance matrix at the time k.

The filter output selection unit 14 selects a regular waveform component predicted by the tracking filter processing unit 11, in the irregular section identified by the irregular section identification unit 13, and selects a regular waveform component predicted by the tracking filter processing unit 12, in the regular section identified by the irregular section identification unit 13, among regular waveform components predicted by the tracking filter processing units 11 and 12.

The processing details of the filter output selection unit 14 will be specifically described below.

First, the filter output selection unit 14 determines whether a determination value FLG output from the irregular section identification unit 13 is 1 (step ST21 in FIG. 6).

If the determination value FLG is 1 (Yes in step ST21), the filter output selection unit 14 recognizes that the current section is an irregular section, selects a regular waveform component predicted by the tracking filter processing unit 11, stores the waveform component into the regular waveform component storage unit 15, and outputs the waveform component to the residual processing unit 16 (step ST22).

If the determination value FLG is 0 (No in step ST21), the filter output selection unit 14 recognizes that the current section is a regular section, selects a regular waveform component predicted by the tracking filter processing unit 12, stores the waveform component into the regular waveform component storage unit 15, and outputs the waveform component to the residual processing unit 16 (step ST23).

Figure 10:
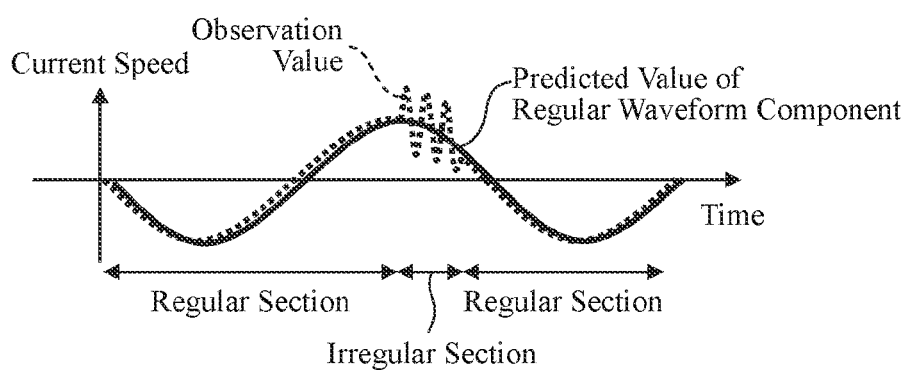
FIG. 10 is an explanatory diagram illustrating time-series data of a predicted value (regular waveform component) selected by the filter output selection unit 14.

Here, FIG. 10 is an explanatory diagram illustrating time-series data of a predicted value (regular waveform component) selected by the filter output selection unit 14.

As illustrated in FIG. 10, in the regular section, because a predicted value of the tracking filter processing unit 12 is selected, a predicted value following observation values is output to the residual processing unit 16.

On the other hand, in the irregular section, because a predicted value of the tracking filter processing unit 11 is selected, a predicted value of a regular waveform component serving as a trend is output to the residual processing unit 16.

When the residual processing unit 16 receives a regular waveform component selected by the filter output selection unit 14, the residual processing unit 16 calculates a residual between the regular waveform component and observation values extracted by the observation value extraction unit 1 (component having a possibility of being an irregular waveform component), stores the residual into the irregular waveform component storage unit 18, and outputs the residual to the irregular waveform detection unit 17.

When the irregular waveform detection unit 17 receives the residual from the residual processing unit 16, the irregular waveform detection unit 17 determines whether the residual is an irregular waveform component.

More specifically, the irregular waveform detection unit 17 compares the residual calculated by the residual processing unit 16 and a preset threshold value, and if the residual is equal to or larger than the threshold value, determines that the residual is an irregular waveform component. In addition, the residual quadratic form represented by Formula (7) may be used for determination, instead of the residual.

As obviously seen from the above, according to the first embodiment, the tracking filter processing units 11 and 12 execute tracking filter processing on observation values extracted by the observation value extraction unit 1 using tracking filters whose drive noises are different to each other. The filter output selection unit 14 selects a regular waveform component predicted by the tracking filter processing unit 11 in the irregular section identified by the irregular section identification unit 13, and selects a regular waveform component predicted by the tracking filter processing unit 12 in the regular section, among regular waveform components predicted by the tracking filter processing units 11 and 12. The residual processing unit 16 calculates a residual between observation values extracted by the observation value extraction unit 1, and a regular waveform component selected by the filter output selection unit 14. The irregular waveform detection unit 17 determines whether the residual is an irregular waveform component. According to the above configuration, as an effect of the present invention, it is possible to correctly detect irregular waveform components included in a signal.

More specifically, according to the first embodiment, among time-series observation values extracted by the observation value extraction unit 1, an irregular section including irregular waveform components is identified. In the regular section, a regular waveform component predicted using a tracking filter having large drive noise is selected, whereas in the irregular section, a regular waveform component predicted using a tracking filter having small drive noise is selected. As a result, as an effect of this embodiment, the irregular waveform components included in the time-series observation values can be correctly detected.

In addition, according to the first embodiment, when the waveform estimation device illustrated in FIG. 1 is used as a tsunami detection device, not only long-period waveform components (regular waveform components) caused by tide, but also short-period waveform components (irregular waveform components) caused by tsunami can be correctly detected. Thus, it is possible to detect the occurrence of tsunami correctly.

Second Embodiment

Figure 11:
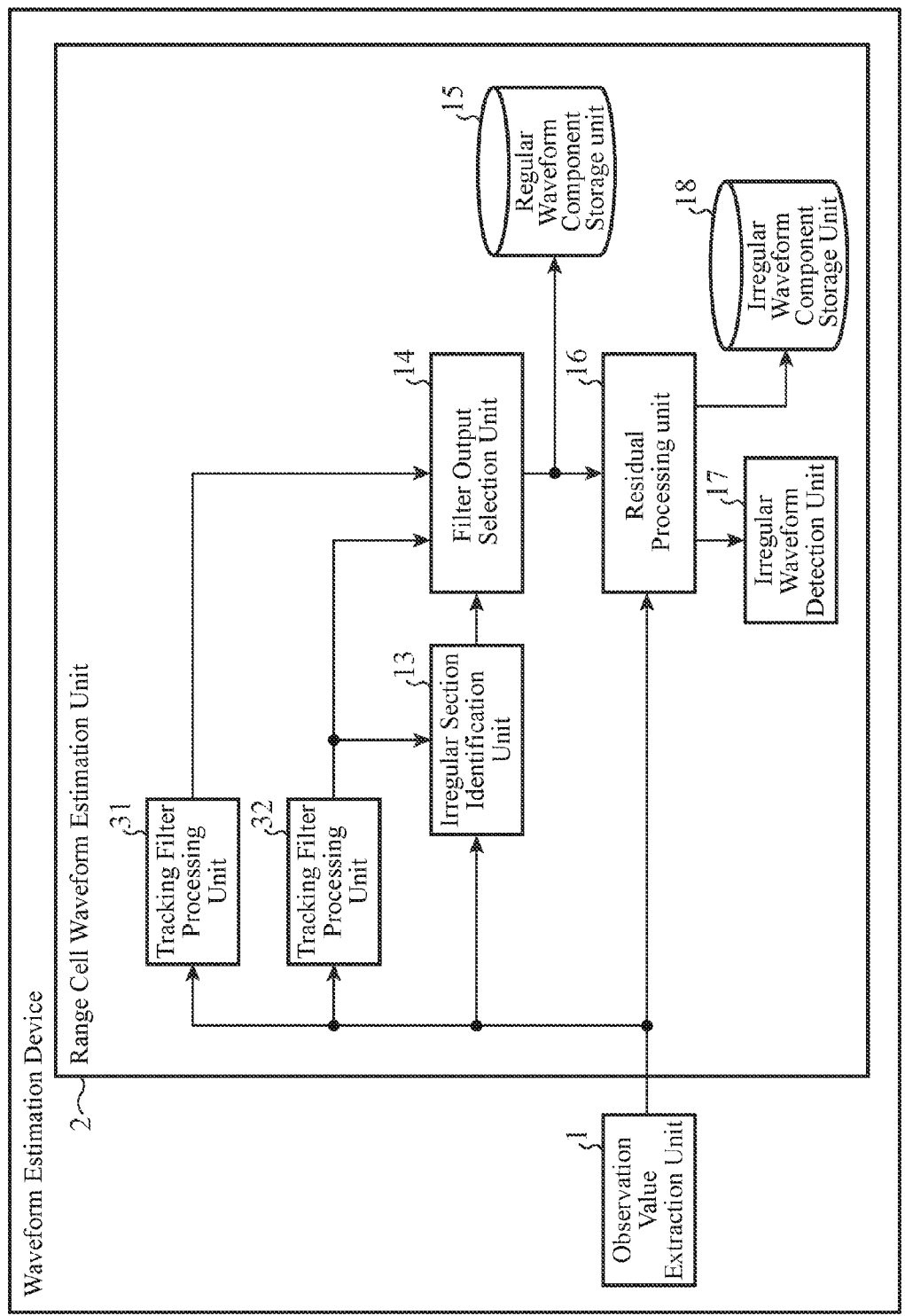
FIG. 11 is a configuration diagram illustrating a waveform estimation device according to a second embodiment of the present invention.

FIG. 11 is a configuration diagram illustrating a waveform estimation device according to a second embodiment of the present invention. In FIG. 11, the same signs as those in FIG. 1 denote the same or corresponding parts. Thus, the description thereof will be omitted.

Similarly to the tracking filter processing unit 11 in FIG. 1, a tracking filter processing unit 31, in which a tracking filter (e.g., a linear least squares filter, an $\alpha$-$\beta$ filter, a Kalman filter, etc.) having small drive noise is implemented, executes tracking filter processing on observation values extracted by the observation value extraction unit 1 using the tracking filter, predicts a regular waveform component included in the observation values, and outputs a predicted value indicating a regular waveform component to the filter output selection unit 14.

However, the tracking filter processing unit 31 differs from the tracking filter processing unit 11 in FIG. 1 in that the tracking filter processing unit 31 executes tracking filter processing on not all the observation values extracted by the observation value extraction unit 1, but executes tracking filter processing only on observation values existing in a correlation gate. Here, the tracking filter processing unit 31 forms a first tracking filter unit.

Similarly to the tracking filter processing unit 12 in FIG. 1, a tracking filter processing unit 32, in which a tracking filter (e.g., a linear least squares filter, an $\alpha$-$\beta$ filter, a Kalman filter, etc.) having large drive noise is implemented, executes tracking filter processing on observation values extracted by the observation value extraction unit 1 using the tracking filter, predicts a regular waveform component included in the observation values, and outputs a predicted value indicating a regular waveform component to the filter output selection unit 14.

However, the tracking filter processing unit 32 differs from the tracking filter processing unit 12 in FIG. 1 in that the tracking filter processing unit 32 executes tracking filter processing on not all the observation values extracted by the observation value extraction unit 1, but executes tracking filter processing only on observation values existing in a correlation gate. Here, the tracking filter processing unit 32 forms a second tracking filter unit.

In the example in FIG. 11, the observation value extraction unit 1, the tracking filter processing units 31 and 32, the irregular section identification unit 13, the filter output selection unit 14, the regular waveform component storage unit 15, the residual processing unit 16, the irregular waveform detection unit 17, and the irregular waveform component storage unit 18, which are constituent elements of the waveform estimation device, are each assumed to be formed by dedicated hardware (e.g., hardware such as a semiconductor integrated circuit implementing a CPU, or a one-chip microcomputer, for constituent elements other than the regular waveform component storage unit 15 and the irregular waveform component storage unit 18). However, the waveform estimation device may be formed by a computer.

As illustrated in FIG. 2, the waveform estimation device can be formed by a computer in the following manner. The regular waveform component storage unit 15 and the irregular waveform component storage unit 18 are formed on a memory 101 of the computer or on an external memory, and programs in which the processing details of the observation value extraction unit 1, the tracking filter processing units 31 and 32, the irregular section identification unit 13, the filter output selection unit 14, the residual processing unit 16, and the irregular waveform detection unit 17 are described are stored in the memory 101 of the computer, and a processor 102 of the computer executes the programs stored in the memory 101.

Figure 12:
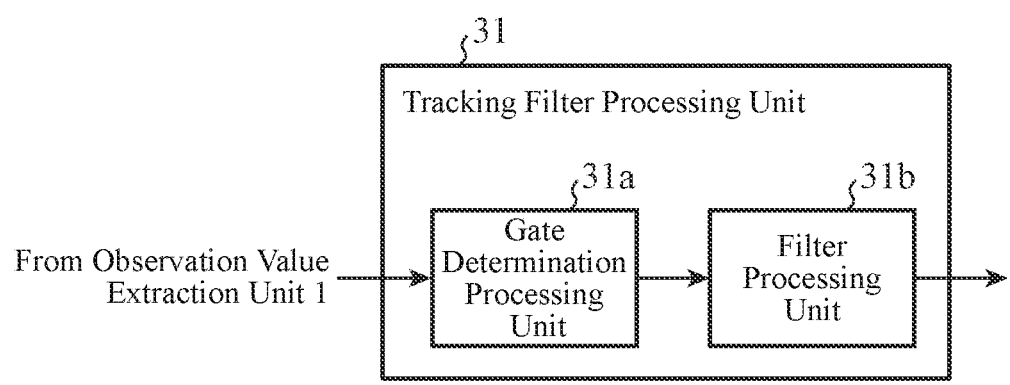
FIG. 12 is a configuration diagram illustrating a tracking filter processing unit 31 of the waveform estimation device according to the second embodiment of the present invention.

FIG. 12 is a configuration diagram illustrating the tracking filter processing unit 31 of the waveform estimation device according to the second embodiment of the present invention.

In FIG. 12, a gate determination processing unit 31a executes processing of generating a correlation gate indicating an appropriate range of observation values extracted by the observation value extraction unit 1 using a predicted value indicating a regular waveform component being a prediction result in the last tracking filter processing, and determining whether the observation values exist within the correlation gate.

A filter processing unit 31b, in which a tracking filter having small drive noise is implemented, executes tracking filter processing on observation values determined by the gate determination processing unit 31a to exist within the correlation gate, among time-series observation values extracted by the observation value extraction unit 1, and predicts a regular waveform component included in the observation values.

Figure 13:
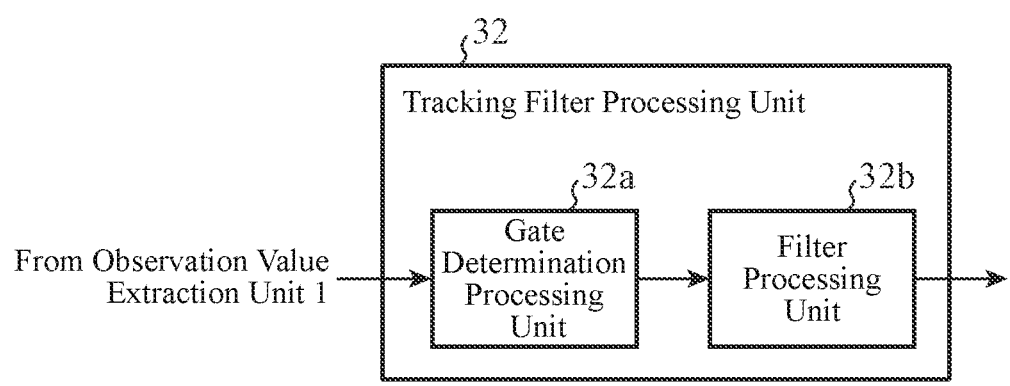
FIG. 13 is a configuration diagram illustrating a tracking filter processing unit 32 of the waveform estimation device according to the second embodiment of the present invention.

FIG. 13 is a configuration diagram illustrating the tracking filter processing unit 32 of the waveform estimation device according to the second embodiment of the present invention.

In FIG. 13, a gate determination processing unit 32a executes processing of generating a correlation gate indicating an appropriate range of observation values extracted by the observation value extraction unit 1 using a predicted value indicating a regular waveform component being a prediction result in the last tracking filter processing, and determining whether the observation values exist within the correlation gate.

A filter processing unit 32b, in which a tracking filter having large drive noise is implemented, executes tracking filter processing on observation values determined by the gate determination processing unit 32a to exist within the correlation gate, among time-series observation values extracted by the observation value extraction unit 1, and predicting a regular waveform component included in the observation values.

Note that, the configurations of the tracking filter processing units 31 and 32 are the same except that the drive noise of the tracking filter implemented by the filter processing unit 31*b* is smaller than the drive noise of the tracking filter implemented by the filter processing unit 32*b*, and the processing details thereof are the same.

Next, an operation in this embodiment will be described.

However, the operation is similar to that in the above-described first embodiment except that the tracking filter processing units 11 and 12 are replaced with the tracking filter processing units 31 and 32. Thus, only the processing details of the tracking filter processing units 31 and 32 will be described.

The gate determination processing unit 31*a* or 32*a* of the tracking filter processing unit 31 or 32 generates a correlation gate indicating an appropriate range of observation values extracted by the observation value extraction unit 1, using a predicted value indicating a regular waveform component being a prediction result in the last tracking filter processing.

More specifically, the gate determination processing unit 31*a* or 32*a* generates a correlation gate as represented by the following formula (9), using a predicted value indicating a regular waveform component being a prediction result in the last tracking filter processing, a prediction error covariance matrix, and an observation noise covariance matrix.

$$(z_k - H_k \hat{x}_{k|k-1})^T S_k^{-1} (z_k - H_k \hat{x}_{k|k-1}) \leq d \quad (9)$$

$$S_k = H_k P_{k|k-1} H_k^T + R_k \quad (10)$$

In Formulae (9) and (10), $S_k$ denotes a residual covariance matrix at the time k, and $P_{k|k-1}$ denotes a prediction error covariance matrix at the time k.

In addition, $R_k$ denotes an observation error covariance matrix at the time k, and d denotes a parameter determining a gate size, and is calculated by $\chi$ square distribution.

When the gate determination processing unit 31*a* or 32*a* generates a correlation gate indicating the appropriate range of observation values, the gate determination processing unit 31*a* or 32*a* substitutes observation values $z_k$ extracted by the observation value extraction unit 1 into Formula (9), and if Formula (9) is satisfied, determines that the observation values $z_k$ exist within the correlation gate, and outputs the observation values $z_k$ to the filter processing unit 31*b* or 32*b*.

On the other hand, if Formula (9) is not satisfied, the gate determination processing unit 31*a* or 32*a* determines that the observation values $z_k$ exist outside the correlation gate, and discards the observation values $z_k$.

When the filter processing unit 31*b* or 32*b* of the tracking filter processing unit 31 or 32 receives observation values $z_k$ from the gate determination processing unit 31*a* or 32*a*, the filter processing unit 31*b* or 32*b* executes tracking filter processing on the observation values $z_k$, predicts a regular waveform component included in the observation values $z_k$, and outputs a predicted value indicating the regular waveform component to the filter output selection unit 14.

As obviously seen from the above, according to the second embodiment, the gate determination processing unit 31*a* or 32*a* of the tracking filter processing unit 31 or 32 generates a correlation gate indicating an appropriate range of observation values $z_k$ extracted by the observation value extraction unit 1 using a predicted value indicating a regular waveform component being a prediction result in the last tracking filter processing, and determines whether the observation values $z_k$ exist within the correlation gate, and if the observation values $z_k$ exist outside the correlation gate, discards the observation values $z_k$ without executing tracking filter processing. According to the above configuration, as an effect of this embodiment, a calculation load can be reduced, and a possibility of erroneously detecting an irregular waveform when an abnormal observation value is observed can be reduced.

Third Embodiment

Figure 14:
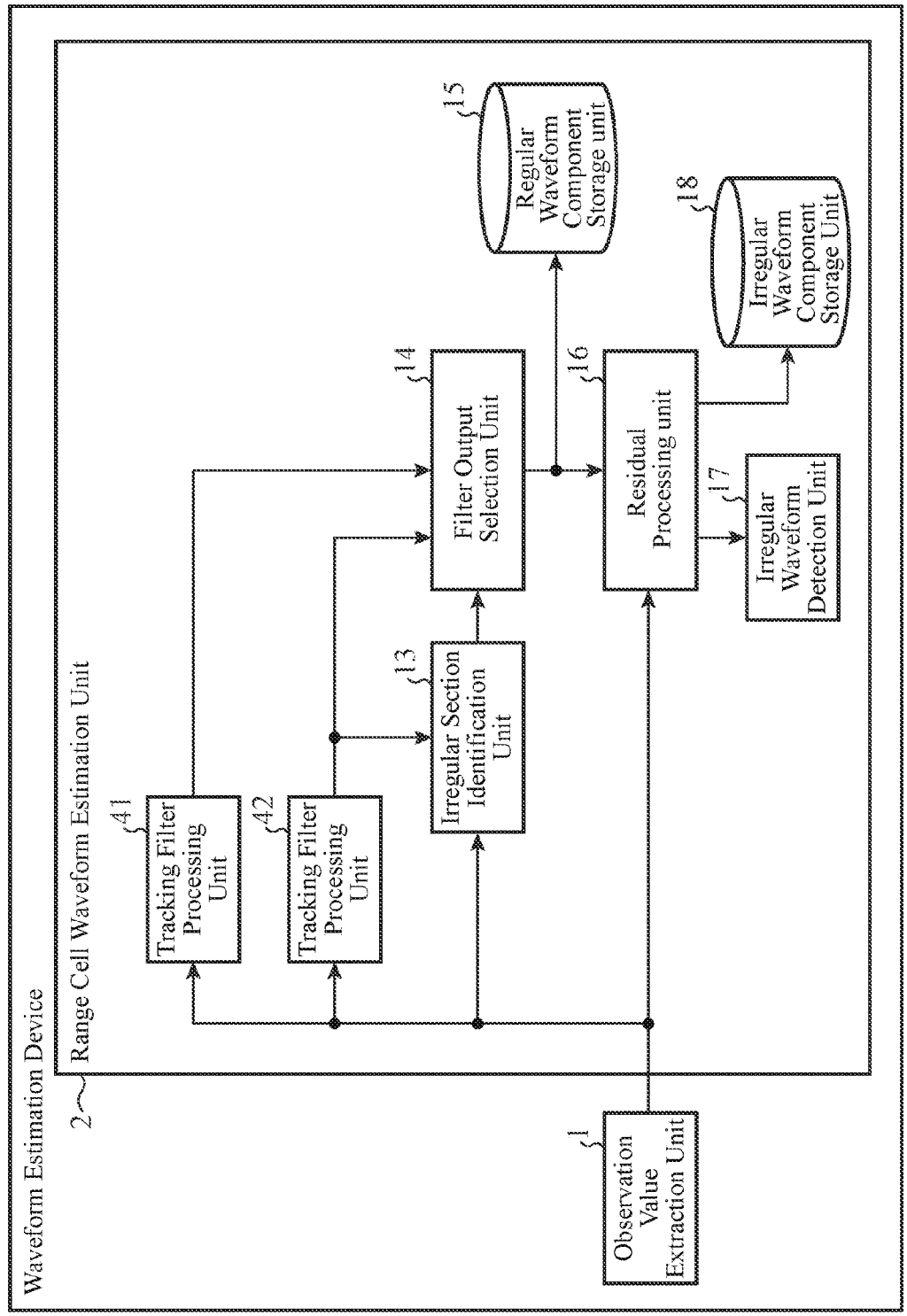
FIG. 14 is a configuration diagram illustrating a waveform estimation device according to a third embodiment of the present invention.

FIG. 14 is a configuration diagram illustrating a waveform estimation device according to a third embodiment of the present invention. In FIG. 14, the same signs as those in FIG. 1 denote the same or corresponding parts. Thus, the description thereof will be omitted.

Similarly to the tracking filter processing unit 11 in FIG. 1, a tracking filter processing unit 41, in which a tracking filter (e.g., a linear least squares filter, an α-β filter, a Kalman filter, etc.) having small drive noise is implemented, executes tracking filter processing on observation values extracted by the observation value extraction unit 1 using the tracking filter, predicts a regular waveform component included in the observation values, and outputs a predicted value indicating a regular waveform component to the filter output selection unit 14.

However, the tracking filter processing unit 41 differs from the tracking filter processing unit 11 in FIG. 1 in that the tracking filter processing unit 41 executes tracking filter processing on not all the observation values extracted by the observation value extraction unit 1, but executes tracking filter processing only on observation values existing in a correlation gate.

In addition, the tracking filter processing unit 41 executes processing of updating a smoothed value indicating a regular waveform component estimated in the past tracking filter processing, using observation values at the current time that exist within the correlation gate, and predicting a regular waveform component included in the observation values, by repeatedly executing tracking filter processing using the updated smoothed value. Here, the tracking filter processing unit 41 forms a first tracking filter unit.

Similarly to the tracking filter processing unit 12 in FIG. 1, the tracking filter processing unit 42, in which a tracking filter (e.g., a linear least squares filter, an α-β filter, a Kalman filter, etc.) having large drive noise is implemented, executes tracking filter processing on observation values extracted by the observation value extraction unit 1 using the tracking filter, predicts a regular waveform component included in the observation values, and outputs a predicted value indicating a regular waveform component to the filter output selection unit 14.

However, the tracking filter processing unit 42 differs from the tracking filter processing unit 12 in FIG. 1 in that the tracking filter processing unit 42 executes tracking filter processing on not all the observation values extracted by the observation value extraction unit 1, but executes tracking filter processing only on observation values existing in a correlation gate.

In addition, the tracking filter processing unit 42 executes processing of updating a smoothed value indicating a regular waveform component estimated in the past tracking filter processing, using observation values at the current time that exist within the correlation gate, and predicting a regular waveform component included in the observation values, by repeatedly executing tracking filter processing using the updated smoothed value. Here, the tracking filter processing unit 42 forms a second tracking filter unit.

In the example in FIG. 14, the observation value extraction unit 1, the tracking filter processing units 41 and 42, the irregular section identification unit 13, the filter output selection unit 14, the regular waveform component storage unit 15, the residual processing unit 16, the irregular waveform detection unit 17, and the irregular waveform component storage unit 18, which are constituent elements of the waveform estimation device, are each assumed to be formed by dedicated hardware (e.g., hardware such as a semiconductor integrated circuit implementing a CPU, or a one-chip microcomputer, for constituent elements other than the regular waveform component storage unit 15 and the irregular waveform component storage unit 18). However, the waveform estimation device may be formed by a computer.

As illustrated in FIG. 2, the waveform estimation device can be formed by a computer in the following manner. The regular waveform component storage unit 15 and the irregular waveform component storage unit 18 are formed on a memory 101 of the computer or on an external memory, and programs in which the processing details of the observation value extraction unit 1, the tracking filter processing units 41 and 42, the irregular section identification unit 13, the filter output selection unit 14, the residual processing unit 16, and the irregular waveform detection unit 17 are described are stored in the memory 101 of the computer, and a processor 102 of the computer executes the programs stored in the memory 101.

Figure 15:
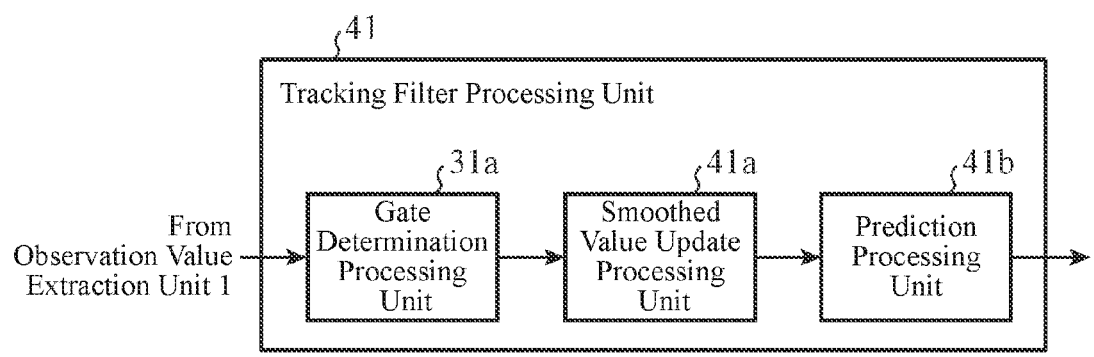
FIG. 15 is a configuration diagram illustrating a tracking filter processing unit 41 of the waveform estimation device according to the third embodiment of the present invention.

FIG. 15 is a configuration diagram illustrating the tracking filter processing unit 41 of the waveform estimation device according to the third embodiment of the present invention. In FIG. 15, the same signs as those in FIG. 12 denote the same or corresponding parts. Thus, the description thereof will be omitted.

A smoothed value update processing unit 41a executes processing of updating a smoothed value indicating a regular waveform component estimated in the past tracking filter processing, using observation values at the current time that is determined by the gate determination processing unit 31a to exist within the correlation gate.

A prediction processing unit 41b executes processing of predicting a regular waveform component included in the observation values, by repeatedly executing tracking filter processing using a smoothed value updated by the smoothed value update processing unit 41a.

Figure 16:
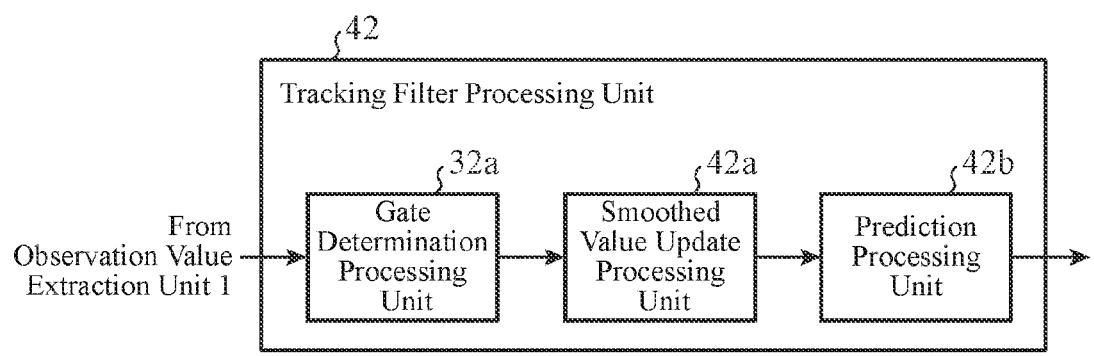
FIG. 16 is a configuration diagram illustrating a tracking filter processing unit 42 of the waveform estimation device according to the third embodiment of the present invention.

FIG. 16 is a configuration diagram illustrating the tracking filter processing unit 42 of the waveform estimation device according to the third embodiment of the present invention. In FIG. 16, the same signs as those in FIG. 13 denote the same or corresponding parts. Thus, the description thereof will be omitted.

A smoothed value update processing unit 42a executes processing of updating a smoothed value indicating a regular waveform component estimated in the past tracking filter processing, using observation values at the current time that is determined by the gate determination processing unit 32a to exist within the correlation gate.

A prediction processing unit 42b executes processing of predicting a regular waveform component included in the observation values, by repeatedly executing tracking filter processing using a smoothed value updated by the smoothed value update processing unit 42a.

Note that, the configurations of the tracking filter processing units 41 and 42 are the same except that the drive noise of the tracking filter implemented by the prediction processing unit 41b is smaller than the drive noise of the tracking filter implemented by the prediction processing unit 42b, and the processing details thereof are the same.

Next, an operation in this embodiment will be described.

However, the operation is similar to that in the above-described first embodiment except that the tracking filter processing units 11 and 12 are replaced with the tracking filter processing units 41 and 42. Thus, only the processing details of the tracking filter processing units 41 and 42 will be described.

Similarly to the above-described second embodiment, the gate determination processing unit 31a or 32a of the tracking filter processing unit 41 or 42 generates a correlation gate indicating an appropriate range of observation values extracted by the observation value extraction unit 1, using a predicted value indicating a regular waveform component being a prediction result in the last tracking filter processing.

When the gate determination processing unit 31a or 32a generates a correlation gate indicating the appropriate range of observation values, similarly to the above-described second embodiment, the gate determination processing unit 31a or 32a substitutes observation values $z_k$ extracted by the observation value extraction unit 1 into Formula (9), and if Formula (9) is satisfied, determines that the observation values $z_k$ exist within the correlation gate, and outputs the observation values $z_k$ to the smoothed value update processing unit 41a or 42a.

On the other hand, if Formula (9) is not satisfied, the gate determination processing unit 31a or 32a determines that the observation values $z_k$ exist outside the correlation gate, and discards the observation values $z_k$.

When the smoothed value update processing unit 41a or 42a of the tracking filter processing unit 41 or 42 receives observation values $z_k$ at the time k from the gate determination processing unit 31a or 32a, the smoothed value update processing unit 41a or 42a updates a smoothed value indicating a regular waveform component estimated in the past tracking filter processing, using the observation values $z_k$ at the time k.

More specifically, the smoothed value update processing unit 41a or 42a performs smoothing processing such as, for example, fixed point smoothing, fixed lag smoothing, and fixed section smoothing, for obtaining an estimated value smoother than a smoothed value (estimated value) obtained using the Kalman filter. By performing such smoothing processing, a regular waveform component serving as a trend in the irregular section can be accurately estimated.

For example, in a case in which the smoothed value update processing unit 41a or 42a uses the fixed lag smoothing, as represented by the following formula (11), the smoothed value update processing unit 41a or 42a updates smoothed values (estimated values) obtained for the past L times, using the observation values $z_k$ at the time k. Here, L denotes the number of lags.

$$\hat{x}_{k-j|k} = \hat{x}_{k-j|k-1} + K_k(j)(z_k - H_k \hat{x}_{k|k-1})(j=0, \ldots, L) \quad (11)$$

When the smoothed value update processing unit 41a or 42a updates the smoothed values (estimated values) obtained for the past L times, the prediction processing unit 41b or 42b of the tracking filter processing unit 41 or 42 executes calculation of a predicted value obtained by long-term prediction (regular waveform component included in the observation values), by repeating prediction processing (tracking filter processing) represented by Formula (4), (j+1) times, on the smoothed values (estimated values). The number of lags L and the number of times j of prediction processing are determined in parameter setting.

As obviously seen from the above, according to the third embodiment, the smoothed value update processing unit 41a or 42a updates a smoothed value indicating a regular waveform component estimated in the past tracking filter processing, using the observation values $z_k$ at the time k that has been output from the gate determination processing unit 31a or 32a. With this configuration, an estimated value smoother than a smoothed value (estimated value) obtained using the Kalman filter can be obtained. This consequently brings about such an effect that a regular waveform component serving as a trend in the irregular section can be accurately estimated.

Fourth Embodiment

Figure 17:
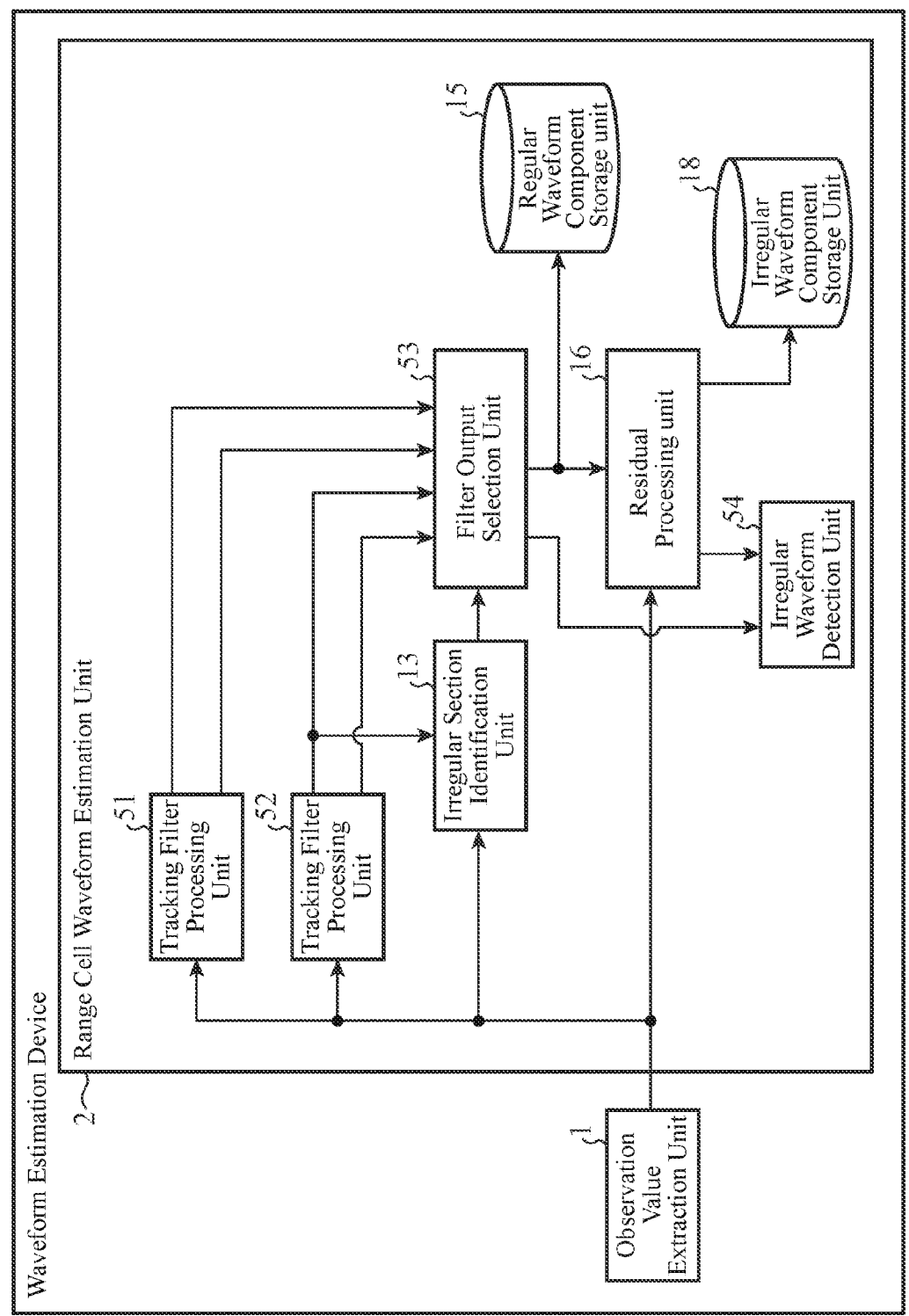
FIG. 17 is a configuration diagram illustrating a waveform estimation device according to a fourth embodiment of the present invention.

FIG. 17 is a configuration diagram illustrating a waveform estimation device according to a fourth embodiment of the present invention. In FIG. 17, the same signs as those in FIG. 1 denote the same or corresponding parts. Thus, the description thereof will be omitted.

Similarly to the tracking filter processing unit 11 in FIG. 1, a tracking filter processing unit 51, in which a tracking filter (e.g., a linear least squares filter, an α-β filter, a Kalman filter, etc.) having small drive noise is implemented, executes tracking filter processing on observation values extracted by the observation value extraction unit 1 using the tracking filter, predicts a regular waveform component included in the observation values, and outputs a predicted value indicating a regular waveform component to a filter output selection unit 53.

However, the tracking filter processing unit 51 differs from the tracking filter processing unit 11 in FIG. 1 in that the tracking filter processing unit 51 executes tracking filter processing on not all the observation values extracted by the observation value extraction unit 1, but executes tracking filter processing only on observation values existing in a correlation gate.

In addition, the tracking filter processing unit 51 executes processing of evaluating, based on the number of observation values existing within the correlation gate, and the number of observation values existing outside the correlation gate, the goodness/badness of tracking quality of a tracking filter, and outputting a Track Quality (TQ) value being an evaluation value of the tracking quality, to the filter output selection unit 53. Note that, the tracking filter processing unit 51 forms a first tracking filter unit.

Similarly to the tracking filter processing unit 12 in FIG. 1, a tracking filter processing unit 52, in which a tracking filter (e.g., a linear least squares filter, an α-β filter, a Kalman filter, etc.) having large drive noise is implemented, executes tracking filter processing on observation values extracted by the observation value extraction unit 1 using the tracking filter, predicts a regular waveform component included in the observation values, and outputs a predicted value indicating a regular waveform component to the filter output selection unit 53.

However, the tracking filter processing unit 52 differs from the tracking filter processing unit 12 in FIG. 1 in that the tracking filter processing unit 52 executes tracking filter processing on not all the observation values extracted by the observation value extraction unit 1, but executes tracking filter processing only on observation values existing in a correlation gate.

In addition, the tracking filter processing unit 52 executes processing of evaluating, based on the number of observation values existing within the correlation gate, and the number of observation values existing outside the correlation gate, goodness/badness of tracking quality of a tracking filter, and outputting a TQ value being an evaluation value of the tracking quality, to the filter output selection unit 53. Here, the tracking filter processing unit 52 forms a second tracking filter unit.

The filter output selection unit 53 executes processing of selecting a regular waveform component and a TQ value that have been predicted by the tracking filter processing unit 51, in the irregular section identified by the irregular section identification unit 13, and selecting a regular waveform component and a TQ value that have been predicted by the tracking filter processing unit 52, in the regular section identified by the irregular section identification unit 13, among regular waveform components predicted by the tracking filter processing units 51 and 52.

Only if an evaluation result of the tracking quality that is obtained by the tracking filter processing unit 51 or 52 is good, an irregular waveform detection unit 54 executes processing of determining whether the residual calculated by the residual processing unit 16 is an irregular waveform component.

Here, the residual processing unit 16 and the irregular waveform detection unit 54 form an irregular waveform determination unit.

In the example in FIG. 17, the observation value extraction unit 1, the tracking filter processing units 51 and 52, the irregular section identification unit 13, the filter output selection unit 53, the regular waveform component storage unit 15, the residual processing unit 16, the irregular waveform detection unit 54, and the irregular waveform component storage unit 18, which are constituent elements of the waveform estimation device, are each assumed to be formed by dedicated hardware (e.g., hardware such as a semiconductor integrated circuit implementing a CPU, or a one-chip microcomputer, for constituent elements other than the regular waveform component storage unit 15 and the irregular waveform component storage unit 18). However, the waveform estimation device may be formed by a computer.

As illustrated in FIG. 2, the waveform estimation device can be formed by a computer in the following manner. The regular waveform component storage unit 15 and the irregular waveform component storage unit 18 are formed on a memory 101 of the computer or on an external memory, and programs in which the processing details of the observation value extraction unit 1, the tracking filter processing units 51 and 52, the irregular section identification unit 13, the filter output selection unit 53, the residual processing unit 16, and the irregular waveform detection unit 54 are described are stored in the memory 101 of the computer, and a processor 102 of the computer executes the programs stored in the memory 101.

Figure 18:
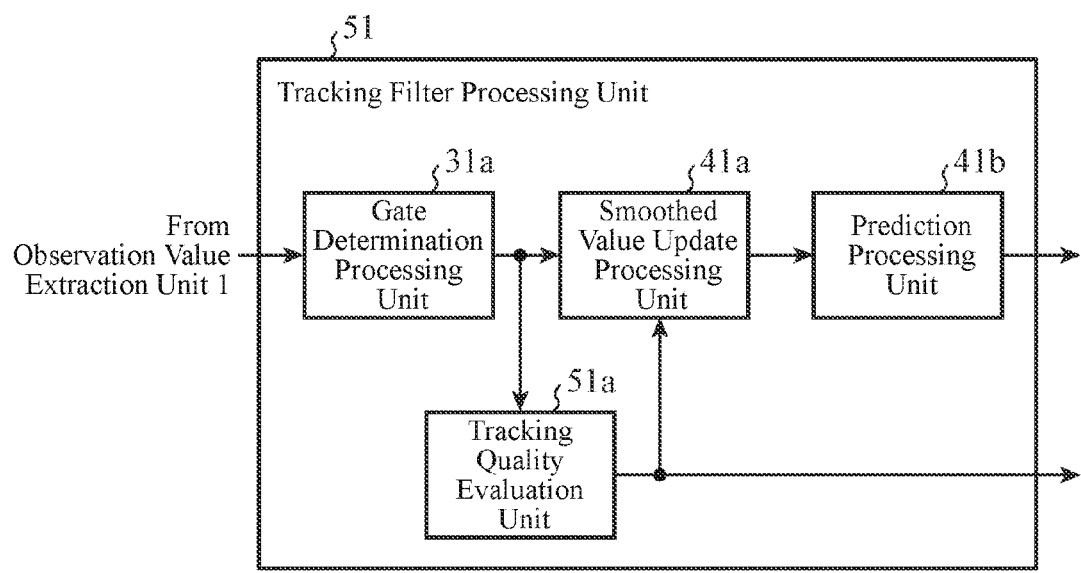
FIG. 18 is a configuration diagram illustrating a tracking filter processing unit 51 of the waveform estimation device according to the fourth embodiment of the present invention.

FIG. 18 is a configuration diagram illustrating the tracking filter processing unit 51 of the waveform estimation device according to the fourth embodiment of the present invention. In FIG. 18, the same signs as those in FIG. 15 denote the same or corresponding parts. Thus, the description thereof will be omitted.

A tracking quality evaluation unit 51a executes processing of evaluating, based on the number of observation values determined by the gate determination processing unit 31a to exist within the correlation gate, and the number of observation values determined to exist outside the correlation gate, goodness/badness of tracking quality of a tracking filter.

Figure 19:
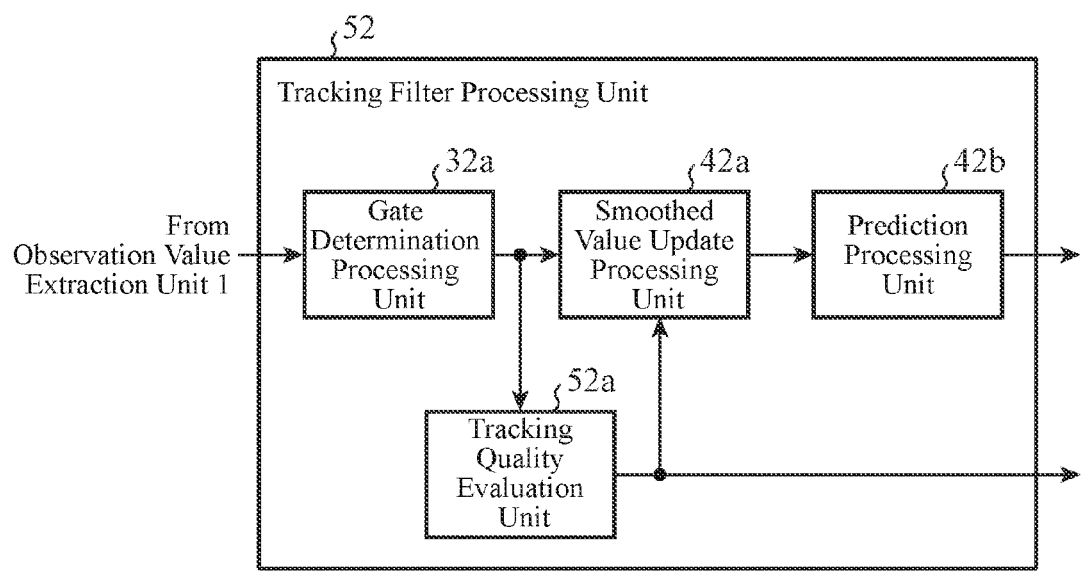
FIG. 19 is a configuration diagram illustrating a tracking filter processing unit 52 of the waveform estimation device according to the fourth embodiment of the present invention.

FIG. 19 is a configuration diagram illustrating the tracking filter processing unit 52 of the waveform estimation device according to the fourth embodiment of the present invention. In FIG. 19, the same signs as those in FIG. 16 denote the same or corresponding parts. Thus, the description thereof will be omitted.

A tracking filter processing unit 52a executes processing of evaluating, based on the number of observation values determined by the gate determination processing unit 32a to exist within the correlation gate, and the number of observation values determined to exist outside the correlation gate, goodness/badness of tracking quality of a tracking filter.

In addition, the configurations of the tracking filter processing units 51 and 52 are the same except that the drive noise of the tracking filter implemented by the prediction processing unit 41b is smaller than the drive noise of the tracking filter implemented by the prediction processing unit 42b, and the processing details thereof are the same.

Next, an operation in this embodiment will be described.

However, the operation is similar to that in the above-described first embodiment except that the tracking filter processing units 11 and 12 are replaced with the tracking filter processing units 51 and 52, the filter output selection unit 14 is replaced with the filter output selection unit 53, and the irregular waveform detection unit 17 is replaced with the irregular waveform detection unit 54. Thus, only parts different from the above-described first embodiment will be described.

The tracking quality evaluation unit 51a or 52a of the tracking filter processing unit 51 or 52 evaluates, based on the number of observation values determined by the gate determination processing unit 31a or 32a to exist within the correlation gate, and the number of observation values determined to exist outside the correlation gate, goodness/badness of tracking quality of a tracking filter, and outputs a TQ value being an evaluation value of the tracking quality, to the smoothed value update processing unit 41a or 42a and the filter output selection unit 53.

More specifically, the tracking quality evaluation unit 51a or 52a holds a TQ value being an evaluation value of the tracking quality, and if observation values are determined by the gate determination processing unit 31a or 32a to exist within the correlation gate, the tracking quality evaluation unit 51a or 52a increments the TQ value by 1, and if the observation values are determined by the gate determination processing unit 31a or 32a to exist outside the correlation gate, the tracking quality evaluation unit 51a or 52a decrements the TQ value by 1.

However, even if the observation values exist within the correlation gate, if the current TQ value is a TQ upper limit value, the tracking quality evaluation unit 51a or 52a maintains the current TQ value.

In addition, even if the observation values exist outside the correlation gate, if the current TQ value is a TQ lower limit value, the tracking quality evaluation unit 51a or 52a maintains the current TQ value.

Figure 20:
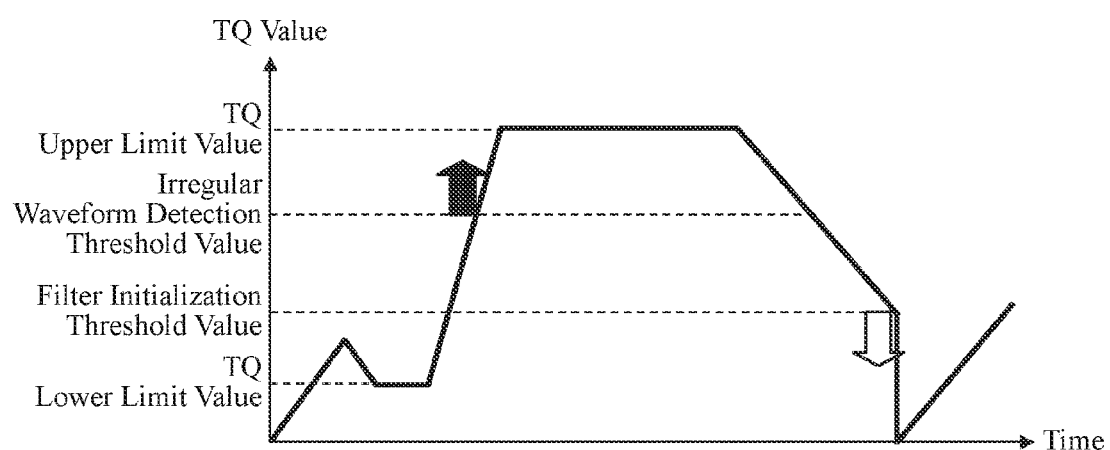
FIG. 20 is an explanatory diagram illustrating a history of TQ values.

Here, FIG. 20 is an explanatory diagram illustrating a history of TQ values. The TQ upper limit value and the TQ lower limit value are values set as parameters. In the example illustrated in FIG. 20, the default value of the TQ value is 0.

If the TQ value output from the tracking quality evaluation unit 51a or 52a falls below a filter initialization threshold value (preset threshold value) after exceeding an irregular waveform detection threshold value (preset threshold value), the smoothed value update processing unit 41a or 42a of the tracking filter processing unit 51 or 52 initializes the tracking filter implemented by the prediction processing unit 41b or 42b. The initialization of the tracking filter includes processing of initializing the TQ value to 0.

In addition, when the smoothed value update processing unit 41a or 42a receives observation values $z_k$ at the time k from the gate determination processing unit 31a or 32a, similarly to the above-described third embodiment, the smoothed value update processing unit 41a or 42a updates a smoothed value indicating a regular waveform component estimated in the past tracking filter processing, using the observation values $z_k$ at the time k.

The filter output selection unit 53 selects a regular waveform component and a TQ value that have been predicted by the tracking filter processing unit 51, in the irregular section identified by the irregular section identification unit 13, among regular waveform components predicted by the tracking filter processing unit 51 or 52, outputs the regular waveform component to the regular waveform component storage unit 15 and the residual processing unit 16, and outputs the TQ value to the irregular waveform detection unit 54.

In addition, the filter output selection unit 53 selects a regular waveform component and a TQ value that have been predicted by the tracking filter processing unit 52, in the regular section identified by the irregular section identification unit 13, outputs the regular waveform component to the regular waveform component storage unit 15 and the residual processing unit 16, and outputs the TQ value to the irregular waveform detection unit 54.

If the TQ value output from the filter output selection unit 53 exceeds the irregular waveform detection threshold value (if the tracking quality is good), similarly to the irregular waveform detection unit 17 in FIG. 1, the irregular waveform detection unit 54 executes processing of determining whether a residual calculated by the residual processing unit 16 is an irregular waveform component.

On the other hand, if the TQ value output from the filter output selection unit 53 is equal to or smaller than the irregular waveform detection threshold value (if the tracking quality is bad), the irregular waveform detection unit 54 does not execute processing of determining whether a residual calculated by the residual processing unit 16 is an irregular waveform component.

As obviously seen from the above, according to the fourth embodiment, only if an evaluation result of the tracking quality obtained by the tracking filter processing unit 51 or 52 is good, the irregular waveform detection unit 54 determines whether a residual calculated by the residual processing unit 16 is an irregular waveform component. According to the above configuration, as an effect of this embodiment, the occurrence of erroneous detection of an irregular waveform, that is caused by performing detection processing of an irregular waveform when the tracking quality is bad, can be reduced.

Fifth Embodiment

Figure 21:
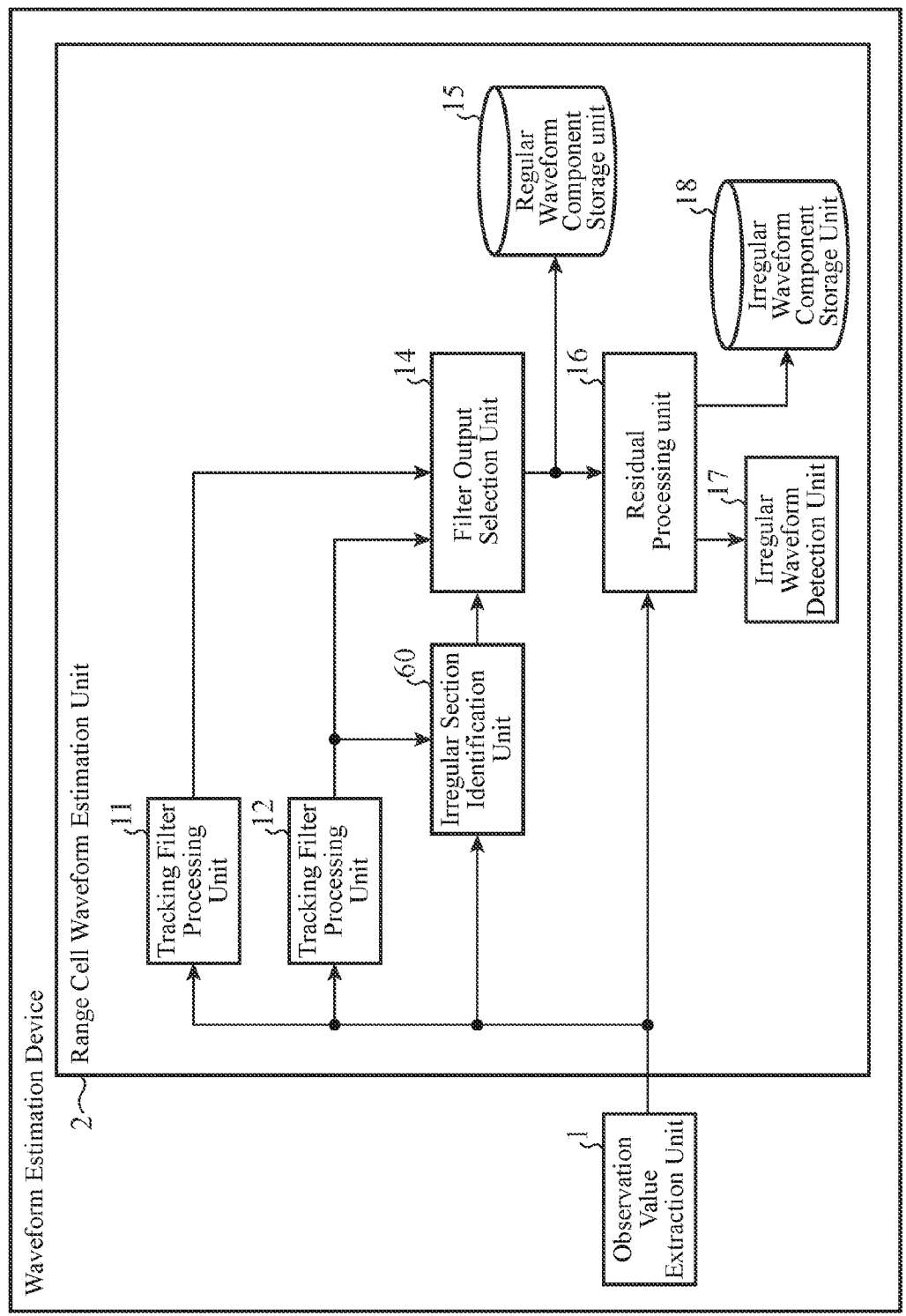
FIG. 21 is a configuration diagram illustrating a waveform estimation device according to a fifth embodiment of the present invention.

FIG. 21 is a configuration diagram illustrating a waveform estimation device according to a fifth embodiment of the present invention. In FIG. 21, the same signs as those in FIG. 1 denote the same or corresponding parts. Thus, the description thereof will be omitted.

An irregular section identification unit 60 implements a threshold value calculation unit 63 (refer to FIG. 22) that calculates standard deviation of regular waveform components included in time-series observation values extracted by the observation value extraction unit 1, and calculates, based on the standard deviation, the irregular section start determination threshold values α and β, and the irregular section end determination threshold value γ, and executes processing of identifying, using these threshold values, an irregular section being a section including irregular waveform components, among time-series observation values extracted by the observation value extraction unit 1.

In the example in FIG. 21, the observation value extraction unit 1, the tracking filter processing units 11 and 12, the irregular section identification unit 60, the filter output selection unit 14, the regular waveform component storage unit 15, the residual processing unit 16, the irregular waveform detection unit 17, and the irregular waveform component storage unit 18, which are constituent elements of the waveform estimation device, are each assumed to be formed by dedicated hardware (e.g., hardware such as a semiconductor integrated circuit implementing a CPU, or a one-chip microcomputer, for constituent elements other than the regular waveform component storage unit 15 and the irregular waveform component storage unit 18). However, the waveform estimation device may be formed by a computer.

As illustrated in FIG. 2, the waveform estimation device can be formed by a computer in the following manner. The regular waveform component storage unit 15 and the irregular waveform component storage unit 18 are formed on a memory 101 of the computer or on an external memory, and programs in which the processing details of the observation value extraction unit 1, the tracking filter processing units 11 and 12, the irregular section identification unit 60, the filter output selection unit 14, the residual processing unit 16, and the irregular waveform detection unit 17 are described are stored in the memory 101 of the computer, and a processor 102 of the computer executes the programs stored in the memory 101.

Figure 22:
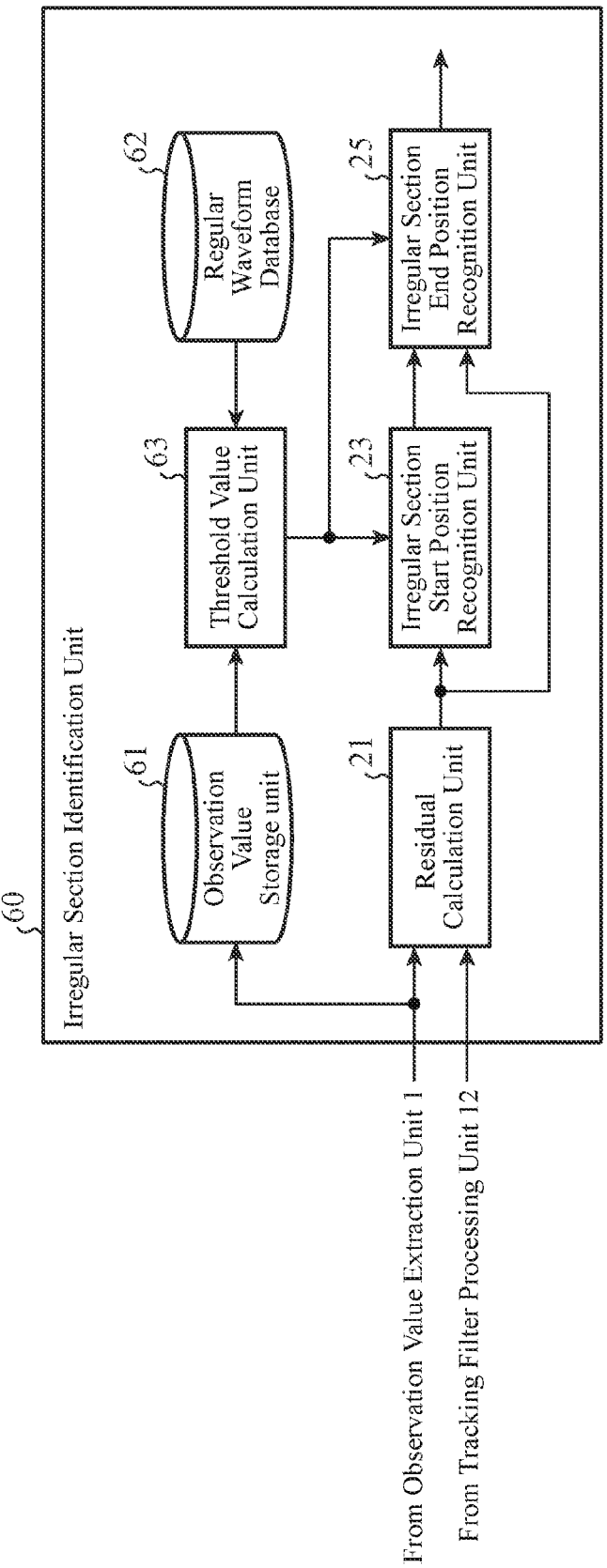
FIG. 22 is a configuration diagram illustrating an irregular section identification unit 60 of the waveform estimation device according to the fifth embodiment of the present invention.

FIG. 22 is a configuration diagram illustrating the irregular section identification unit 60 of the waveform estimation device according to the fifth embodiment of the present invention. In FIG. 22, the same signs as those in FIG. 3 denote the same or corresponding parts. Thus, the description thereof will be omitted.

An observation value storage unit 61 is a memory storing time-series observation values extracted by the observation value extraction unit 1.

A regular waveform database 62 is a memory holding the latest regular waveform component.

The threshold value calculation unit 63 executes processing of calculating standard deviation of regular waveform components included in time-series observation values held by the observation value storage unit 61, and calculating, based on the standard deviation, the irregular section start determination threshold values α and β, and the irregular section end determination threshold value γ.

In addition, when the latest regular waveform components are held by the regular waveform database 62, the threshold value calculation unit 63 executes processing of calculating standard deviation of the regular waveform components, and calculating, based on the standard deviation, the irregular section start determination threshold values α and β, and the irregular section end determination threshold value γ.

Next, an operation in this embodiment will be described.

However, the operation is similar to that in the aforementioned first embodiment except that the irregular section identification unit 13 is replaced with the irregular section identification unit 60. Thus, only the processing details of the irregular section identification unit 60 will be described.

If the tracking filter processing unit 12 predicts a regular waveform component, similarly to the aforementioned first embodiment, the residual calculation unit 21 of the irregular section identification unit 60 calculates a residual $e_k$ between observation values $z_k$ at the time k that has been extracted by the observation value extraction unit 1, and a predicted value $\tilde{x}_{k|k-1}$ tilde from the time k−1 to the time k that has been output by the tracking filter processing unit 12 (refer to Formula (6)).

The time-series observation value extracted by the observation value extraction unit 1 is stored in the observation value storage unit 61.

The threshold value calculation unit 63 calculates variance of regular waveform components included in the time-series observation value held by the observation value storage unit 61, and calculates standard deviation σ based on the variance.

When the threshold value calculation unit 63 calculates the standard deviation σ, the threshold value calculation unit 63 further calculates the irregular section start determination threshold values α and β, and the irregular section end determination threshold value γ, based on the standard deviation σ.

Specifically, as an example, the standard deviation σ*2 is determined as the irregular section start determination threshold value α, the standard deviation σ*3 is determined as the irregular section start determination threshold value β, and the standard deviation σ is determined as the irregular section end determination threshold value γ.

In this example, the variance of regular waveform components included in the time-series observation value held by the observation value storage unit 61 is calculated, and the standard deviation σ is calculated based on the variance. Alternatively, when the latest regular waveform components are held in the regular waveform database 62, the variance of the regular waveform components may be calculated, and the standard deviation σ may be calculated based on the variance.

When the residual calculation unit 21 calculates the residual $e_k$, the irregular section start position recognition unit 23 identifies a section in which the magnitude |e| of the residual e exceeds the irregular section start determination threshold value α calculated by the threshold value calculation unit 63, P consecutive times, or a section in which the magnitude |e| of the residual e exceeds the irregular section start determination threshold value β, Q consecutive times.

Similarly to the aforementioned first embodiment, the irregular section start position recognition unit 23 recognizes the section in which the magnitude |e| of the residual e consecutively exceeds the irregular section start determination threshold value α (or β), as a section serving as a start position of the irregular section.

When the irregular section start position recognition unit 23 recognizes the start of the irregular section and sets the determination value FLG to 1, the irregular section end position recognition unit 25 identifies a section in which the magnitude |e| of the residual e calculated by the residual calculation unit 21 falls below the irregular section end determination threshold value γ calculated by the threshold value calculation unit 63, S consecutive times.

Similarly to the aforementioned first embodiment, the irregular section end position recognition unit 25 recognizes the section in which the magnitude |e| of the residual e falls below the irregular section end determination threshold value γ, S consecutive times, as a section serving as an end position of the irregular section.

As obviously seen from the above, according to the fifth embodiment, the threshold value calculation unit 63 calculates standard deviation σ of regular waveform components included in the time-series observation value held by the observation value storage unit 61, and calculates the irregular section start determination threshold values α and β, and the irregular section end determination threshold value γ based on the standard deviation σ. According to this configuration, as an effect of this embodiment, the irregular section start determination threshold values α and β, and the irregular section end determination threshold value γ can be automatically set even if observation noises of regular waveform components vary in accordance with the difference of the observation locations and observation days.

Sixth Embodiment

Figure 23:
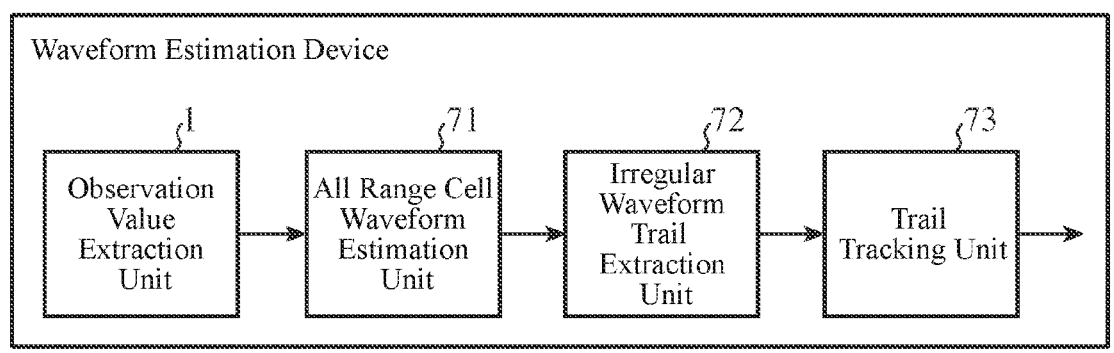
FIG. 23 is a configuration diagram illustrating a waveform estimation device according to a sixth embodiment of the present invention.

FIG. 23 is a configuration diagram illustrating a waveform estimation device according to a sixth embodiment of the present invention. In FIG. 23, the same signs as those in FIG. 1 denote the same or corresponding parts. Thus, the description thereof will be omitted.

An all range cell waveform estimation unit 71 executes processing similar to that of the range cell waveform estimation unit 2 in the aforementioned first to fifth embodiments, and executes processing of detecting irregular waveform components in all the range cells in a radar-coverage range.

An irregular waveform trail extraction unit 72 executes processing of identifying, among the range cells in the two-dimensional space, a range cell determined by the all range cell waveform estimation unit 71 to be an irregular waveform component, and extracting the trail of the irregular waveform component from a time variation in the range cell.

A trail tracking unit 73 executes processing of predicting the movement of the irregular waveform component by executing tracking processing of the trail extracted by the irregular waveform trail extraction unit 72.

In the example in FIG. 23, the observation value extraction unit 1, the all range cell waveform estimation unit 71, the irregular waveform trail extraction unit 72, and the trail tracking unit 73, which are constituent elements of the waveform estimation device, are each assumed to be formed by dedicated hardware (e.g., hardware such as a semiconductor integrated circuit implementing a CPU, or a one-chip microcomputer). However, the waveform estimation device may be formed by a computer.

As illustrated in FIG. 2, the waveform estimation device can be formed by a computer in the following manner. Programs in which the processing details of the observation value extraction unit 1, the all range cell waveform estimation unit 71, the irregular waveform trail extraction unit 72, and the trail tracking unit 73 are described are stored in a memory 101 of a computer, and a processor 102 of the computer executes the programs stored in the memory 101.

Next, an operation in this embodiment will be described.

The all range cell waveform estimation unit 71 executes processing similar to that of the range cell waveform estimation unit 2 in the aforementioned first to fifth embodiments, and executes processing of detecting irregular waveform components in all the range cells in a radar-coverage range.

The irregular waveform trail extraction unit 72 identifies, among the range cells in the two-dimensional space, a range cell determined by the all range cell waveform estimation unit 71 to be an irregular waveform component, and extracts the trail of the irregular waveform component from a time variation in the range cell.

For example, the M-out-of-N method or the like can be used as extraction processing of the trail of the irregular waveform component.

When the irregular waveform trail extraction unit 72 extracts a trail of the irregular waveform component, the trail tracking unit 73 predicts the movement of the irregular waveform component by executing tracking processing of the extracted trail. The tracking processing of the trail itself is a known technique so that the detailed description thereof will be omitted.

Here, FIG. 24 is an explanatory diagram illustrating an extraction example of a trail of an irregular waveform component.

In FIG. 24, it cannot be determined whether an irregular waveform component detected at the time k is an irregular waveform. However, by establishing the trail of the irregular waveform based on a plurality of times of observation, as illustrated in the example of the time k+2, erroneous detection can be reduced.

In addition, by predicting the movement of the irregular waveform component, prediction of spacial movement of an irregular waveform can be performed.

As obviously seen from the above, according to the sixth embodiment, the irregular waveform trail extraction unit 72 identifies, among the range cells in the two-dimensional space, a range cell determined by the all range cell waveform estimation unit 71 to be an irregular waveform component, and extracts the trail of the irregular waveform component from a time variation in the range cell. The trail tracking unit 73 predicts the movement of the irregular waveform component by executing the tracking processing of the trail extracted by the irregular waveform trail extraction unit 72. According to this configuration, as an effect of this embodiment, erroneous detection of an irregular waveform component can be reduced, and prediction of spacial movement of an irregular waveform can be performed.

In the present invention, the embodiments can be freely combined, any constituent element in the embodiments can be modified, or any constituent element in the embodiments can be omitted, without departing from the scope of the invention.

INDUSTRIAL APPLICABILITY

The waveform estimation device and the waveform estimation method according to the present invention are suitable for a device and a method with which an accurate detection of irregular waveform components included in a signal is required, when discrimination of regular waveform components and irregular waveform components included in the signal is performed.

REFERENCE SIGNS LIST

1: observation value extraction unit, 2: range cell waveform estimation unit, 11: tracking filter processing unit (first tracking filter unit), 12: tracking filter processing unit (second tracking filter unit), 13: irregular section identification unit, 14: filter output selection unit, 15: regular waveform component storage unit, 16: residual processing unit (irregular waveform determination unit), 17: irregular waveform detection unit (irregular waveform determination unit), 18: irregular waveform component storage unit, 21: residual calculation unit, 22: irregular section start determination threshold value holding unit, 23: irregular section start position recognition unit, 24: irregular section end determination threshold value holding unit, 25: irregular section end position recognition unit, 31: tracking filter processing unit (first tracking filter unit), 31*a*: gate determination processing unit, 31*b*: filter processing unit, 32: tracking filter processing unit (second tracking filter unit), 32*a*: gate determination processing unit, 32*b*: filter processing unit, 41: tracking filter processing unit (first tracking filter unit), 41*a*: smoothed value update processing unit, 41*b*: prediction processing unit, 42: tracking filter processing unit (second tracking filter unit), 42*a*: smoothed value update processing unit, 42*b*: prediction processing unit, 51: tracking filter processing unit (first tracking filter unit), 51*a*: tracking quality evaluation unit, 52: tracking filter processing unit (second tracking filter unit), 52*a*: tracking quality evaluation unit, 53: filter output selection unit, 54: irregular waveform detection unit (irregular waveform determination unit), 60: irregular section identification unit, 61: observation value storage unit, 62: regular waveform database, 63: threshold value calculation unit, 71: all range cell waveform estimation unit, 72: irregular waveform trail extraction unit, 73: trail tracking unit, 101: memory, and 102: processor.

The invention claimed is:

1. A waveform estimation device comprising:
an observation value extractor extracting, from a signal radiated or reflected by an observation target, time-series observation values of the observation target;
a first tracking filter predicting a regular waveform component included in the observation values, by executing tracking filter processing on the time-series observation values;
a second tracking filter predicting a regular waveform component included in the observation values, by executing tracking filter processing on the time-series observation values using a tracking filter having larger drive noise than drive noise of a tracking filter used in the tracking filter processing by the first tracking filter;
an irregular section identificator identifying, an irregular section being a section including an irregular waveform component among the time-series observation values;
a selector selecting a regular waveform component predicted by the first tracking filter, in the irregular section, and selecting a regular waveform component predicted by the second tracking filter, in a section other than the irregular section, among regular waveform components predicted by the first and second tracking filters; and
an irregular waveform determinator determining whether a residual between observation values extracted by the observation value extractor, and a regular waveform component selected by the selector is an irregular waveform component.

2. The waveform estimation device according to claim 1, wherein the irregular section identificator includes:
a residual calculator calculating a residual between time-series observation values extracted by the observation value extractor, and a regular waveform component predicted by the second tracking filter;
a start position recognizer identifying a section in which the residual calculated by the residual calculator consecutively exceeds an irregular section start determination threshold value a preset number of times as an exceeding section, and recognizing the exceeding section as a start position of the irregular section;
an end position recognizer identifying, after the start position of the irregular section has been recognized by the start position recognizer, a section in which the residual calculated by the residual calculator consecutively falls below an irregular section end determination threshold value a preset number of times as a falling section, and recognizing the falling section as an end position of the irregular section.

3. The waveform estimation device according to claim 1, wherein each of the first and second tracking filters includes:
a gate determination processor generating a correlation gate indicating an appropriate range of observation values extracted by the observation value extractor, using a predicted value indicating a regular waveform component being a prediction result in last tracking filter processing, and determining whether the observation values exist within the correlation gate; and
a filter processor predicting, by executing tracking filter processing on observation values determined by the gate determination processor to exist within the correlation gate, a regular waveform component included in the observation values.

4. The waveform estimation device according to claim 3, wherein each of the first and second tracking filters includes a tracking quality evaluator evaluating goodness/badness of tracking quality of a tracking filter, based on the number of observation values determined by the gate determination processor to exist within the correlation gate, and the number of observation values determined to exist outside the correlation gate, and
wherein the irregular waveform determinator determines whether a residual between observation values extracted by the observation value extractor, and a regular waveform component selected by the selector is an irregular waveform component, only in a case in which an evaluation result of tracking quality obtained by the tracking quality evaluator indicates good.

5. The waveform estimation device according to claim 1, wherein each of the first and second tracking filters includes:
a gate determination processor generating a correlation gate indicating an appropriate range of observation values extracted by the observation value extractor, using a predicted value indicating a regular waveform component being a prediction result in last tracking filter processing, and determining whether the observation values exists within the correlation gate;
a smoothed value update processor updating a smoothed value indicating a regular waveform component estimated in past tracking filter processing, using observation values at a current time that is determined by the gate determination processor to exist within the correlation gate; and
a prediction processor predicting a regular waveform component included in observation values extracted by the observation value extractor, by repeatedly executing the tracking filter processing using a smoothed value updated by the smoothed value update processor.

6. The waveform estimation device according to claim 5, wherein each of the first and second tracking filters includes a tracking quality evaluator for evaluating goodness/badness of tracking quality of a tracking filter, based on the number of observation values determined by the gate determination processor to exist within the correlation gate, and the number of observation values determined to exist outside the correlation gate, and
wherein the irregular waveform determinator determines whether a residual between observation values extracted by the observation value extractor, and a regular waveform component selected by the selector is an irregular waveform component, only in a case in which an evaluation result of tracking quality obtained by the tracking quality evaluator indicates good.

7. The waveform estimation device according to claim 2, wherein the irregular section identificator includes a threshold value calculator calculating standard deviation of regular waveform components included in time-series observation values extracted by the observation value extractor, and calculating the irregular section start determination threshold value and the irregular section end determination threshold value, based on the standard deviation.

8. The waveform estimation device according to claim 1, further comprising:
  a trail extractor identifying, among range cells in a two-dimensional space, a range cell determined by the irregular waveform determinator to be an irregular waveform component, and extracting a trail of the irregular waveform component from a time variation in the identified range cell; and
  a trail tracker for predicting a movement of the irregular waveform component by executing tracking processing of the trail extracted by the trail extractor.

9. A waveform estimation method comprising:
  extracting, by an observation value extractor, from a signal radiated or reflected by an observation target, time-series observation values of the observation target;
  predicting, by a first tracking filter, a regular waveform component included in the observation values, by executing tracking filter processing on the time-series observation values;
  predicting, by a second tracking filter, a regular waveform component included in the observation values, by executing tracking filter processing on the time-series observation values using a tracking filter having larger drive noise than drive noise of a tracking filter used in the tracking filter processing by the first tracking filter;
  identifying among the time-series observation values, an irregular section being a section including an irregular waveform component;
  selecting, by a selector, a regular waveform component predicted by the first tracking filter, in the irregular section, and selecting a regular waveform component predicted by the second tracking filter, in a section other than the irregular section, among regular waveform components predicted by the first and second tracking filters; and
  determining whether a residual between observation values extracted by the observation value extractor, and a regular waveform component selected by the selector is an irregular waveform component.

* * * * *